United States Patent [19]

White et al.

[11] 3,927,251

[45] Dec. 16, 1975

[54] METHOD AND APPARATUS FOR THE DETECTION AND CONTROL OF ERRORS IN TWO-DIMENSIONALLY COMPRESSED IMAGE DATA

[75] Inventors: Hugh Edward White, Pennington; Michael David Lippman, Hightstown, both of N.J.

[73] Assignee: RCA Corporation, New York, N.Y.

[22] Filed: Oct. 7, 1974

[21] Appl. No.: 513,038

Related U.S. Application Data

[63] Continuation-in-part of Ser. No. 361,451, May 18, 1973, abandoned.

[52] U.S. Cl. ............................... 178/6; 178/DIG. 3

[51] Int. Cl. ........................................... H04n 7/12

[58] Field of Search .......................... 178/6, DIG. 3

*Primary Examiner*—R. L. Griffin
*Assistant Examiner*—Edward L. Coles
*Attorney, Agent, or Firm*—Joseph S. Tripoli; Edward J. Norton

[57] ABSTRACT

A method and apparatus for the detection and control of errors occurring in two-dimensionally compressed image data, which method and apparatus take particular advantage of the data structure utilized in two-dimensionally compressed image data facsimile systems. The detection and control apparatus operates as an integral part of the facsimile system and is therefore implemented by a minimum amount of additional hardware.

13 Claims, 26 Drawing Figures

RUN LENGTH / REFERENCE CODE DICTIONARY
| 4-BIT CODEWORD | | 8-BIT CODEWORD | |
|---|---|---|---|
| CODEWORD IN HEX. | ENTRY | CODEWORD IN HEX. | ENTRY |
| ϕ | 8ϕ's | ϕ9 | 72 ϕ's |
| 1 | 1 | ϕA | 64 ϕ's |
| 2 | 01 | ϕB | 24 ϕ's |
| 3 | 001 | ϕC | 32 ϕ's |
| 4 | 0001 | ϕD | 40 ϕ's |
| 5 | 00001 | ϕE | 48 ϕ's |
| 6 | 000001 | ϕF | 56 ϕ's |
| 7 | 0000001 | DB | 128 ϕ's |
| 8 | 00000001 | DC | 96 ϕ's |
| 9 | REF. LS | DF | 112 ϕ's |
| A | REF. RS | EB | 192 ϕ's |
| B | REF. SSS | EC | 256 ϕ's |
| C | REF. S | EF | BLANK LINE OR END OF LINE |
| D | REF. L | | |
| E | REF. R | | |
| F | REF. SS | | |
FIG. 2
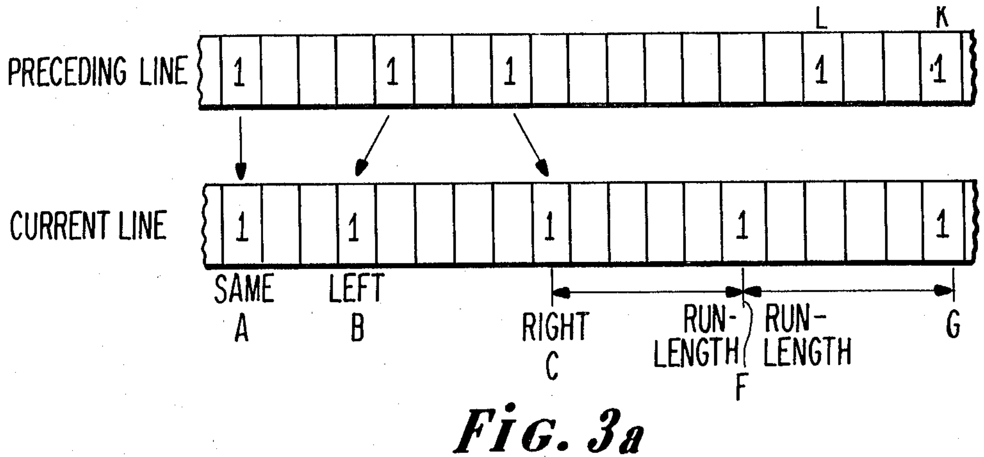
FIG. 3a
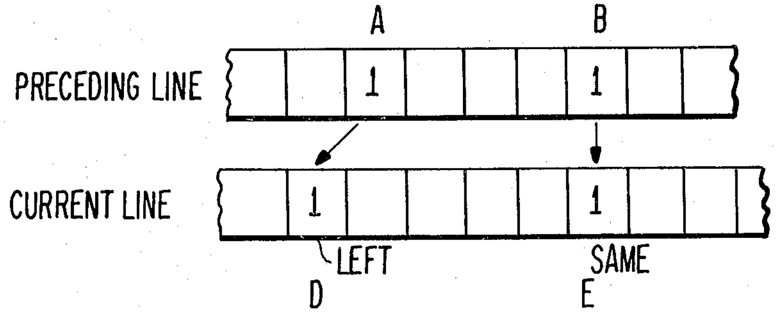
FIG. 3b

METHOD AND APPARATUS FOR THE DETECTION AND CONTROL OF ERRORS IN TWO-DIMENSIONALLY COMPRESSED IMAGE DATA

This is a continuation-in-part of a copending application, Ser. No. 361,451, filed May 18, 1973 and now abandoned.

This application pertains to the field of two-dimensional image data compression facsimile apparatus and, in particular, pertains to the detection and control of errors occurring during the encoding, transmission and decoding of the compressed image data.

PRIOR ART

As transmission of data manifesting graphical images becomes increasingly more important, methods of minimizing the amount of data transmitted thereby shortening transmission times, are being sought. Methods, such as two-dimensional image data compression, utilize the correlation between adjacent portions of an image to minimize the data manifesting the image. In one-dimensional image data compression, graphical images are encoded by defining the location of transitions between tones in the copy along horizontal grid lines. Basically, two-dimensional image data compression utilizes the correlation between adjacent lines in the copy containing the image. In two-dimensional image data compression, successive lines are encoded by locating transitions between tones in the copy in one line relative to transitions between tones in the preceding line, wherever possible. Two-dimensional image data compression is generally explained in a chapter entitled, "Dictionary Look-Up Encoding of Graphic Data," by H. E. White, M. D. Lippman and K. H. Powers, of a book entitled "Picture Bandwidth Compression," edited by T. S. Huang and O. J. Tretiak and published by Gordon and Breach, Science Publishers, in 1972. The same chapter shows and describes a dictionary of code-words similar to the dictionary of FIG. 2 which may be used for encoding two-dimensionally compressed image data and an encoder which may be used to encode one-dimensionally compressed image data. In addition, a decoder which is useful in decoding two-dimensionally compressed image data is shown and briefly described in a paper by I. Gorog, P. M. Heyman, H. K. Kim and M. D. Lippman, presented at the 1971 Society for Information Display (SID), International Symposium (May 4, 5 and 6, 1971). The decoder shown and described in this paper is similar to the decoders of FIGS. 5, 6 and 7 in the present application, but with none of the present invention's provisions for implementing error detection and control.

An error occurring in compressed image data is far more significant than an error in non-compressed manifesting image information by a one-to-one correspondence. For example, in two-dimensionally compressed image data facsimile apparatus, the deletion or addition of a bit in the compressed data may cause a substantial portion of a line to be erroneously written as one tone which is thereafter repeated throughout the copy because of line-to-line reference encoding, whereas in one-to-one image data facsimile apparatus the deletion or addition of a bit causes only a small picture element to be written as a wrong tone.

In general, error detection and control takes two forms. In the first form, bits used only for error detection and manifesting no information are added to fixed blocks of information data. In the second form, bits used for both error detection and correction but manifesting no information are added to fixed blocks of information data. In the second form, the added error bits are arranged in an error code format, such as the Hamming code, which permits the erroneous data to be corrected upon the detection of an error. An excellent reference which summarizes the state of the art in error detection and control is an article entitled "Error Control: Keeping Data Message Clean," by K. I. Nording and appearing in the Electronics trade magazine's 1972 Desk Book Data Communications Supplement.

Although these two aforementioned techniques can be adapted for use in facsimile apparatus, they are impractical for compressed image data facsimile applications. In general, these error detecting techniques require a fixed length block of data. By its nature, two-dimensional image data compression involves use of data groupings which are variable in bit length. In addition, the purpose of image data compression is to reduce the number of bits transmitted. To be highly efficient, the aforementioned error detection and control techniques involve adding a significant number of bits to the blocks of data which carry no information other than for error detection and control, which is counter to the very purpose of image data compression

SUMMARY OF THE INVENTION

The present invention is directed to error detection in a compressed image data facsimile system. This system employs an encoder of a type which encodes the location of transitions between tones in a scanned line of an image utilizing run-length code-words and/or reference code-words. The run-length code-words manifest the distance between transitions on the same line and the reference code-words manifest the relative location of a transition on one (current) line to the location of a transition in a preceding line. Further, novel means are provided in the encoder which provide error detection capability. These novel means encode the location of the terminal point at the end of a scanned line as if it were a transition and generate an end-of-line code-word identifying the code-word manifesting the location of the terminal point as being at the end of the scanned line. The encoder also provides means for multiplexing the code-words for transmission.

The compressed image data facsimile system also employs a decoder for detecting and decoding received multiplexed run-length and reference code-words. Novel means are provided in the decoder which provide error detection capability. These novel means determine the length of the encoded line by accumulating distances between successive transitions as the encoded line is decoded and generate a complete line signal when the manifested length of a decoded line corresponds to the length of a complete scanned line. The novel means in the decoder also generate an end-of-line signal when an end-of-line code-word is detected. When either the end-of-line signal or the complete line signal occurs without the simultaneous occurrence of the other, the novel means in the decoder generates an error signal manifesting the occurrence of an error.

Together with the means for detecting an error in the compressed image data, means responsive to the error signal may be provided to initiate various error control operations.

Because of the complex interaction of the error detection and control apparatus embodying the invention, and the two-dimensionally compressed data facsimile system in which it may be utilized, the following description provides a comprehensive explanation of two-dimensional data image compression and a detailed explanation of the decoder and encoder which form the two-dimensional facsimile apparatus. This is done before the error detection and control apparatus is described.

BRIEF DESCRIPTION OF THE DRAWING

FIG. 2 is a table of the run-length/reference code dictionary used to encode the information manifested in FIG. 1*b*.

FIGS. 3*a* and 3*b* are graphical representations useful in the explanation of run-length/reference encoding.

DETAILED DESCRIPTION OF THE DRAWING

DESCRIPTION OF TWO-DIMENSIONALLY COMPRESSED IMAGE DATA ENCODING

Figure 1A:
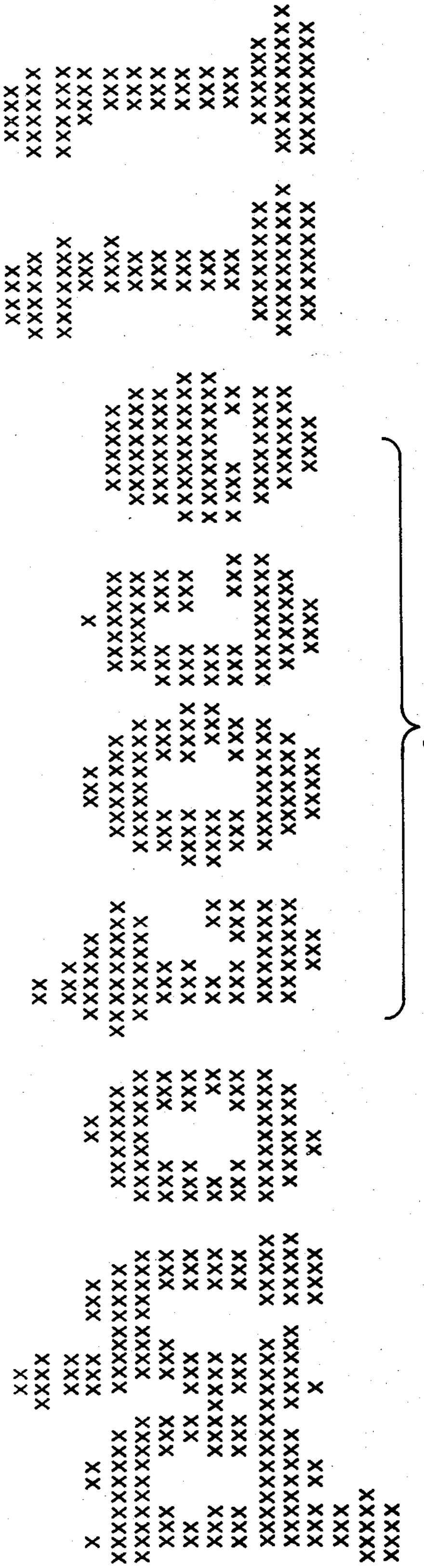
FIG. 1*a* is a pictorial representation of a two-dimensional array of picture elements manifesting the word "photocell" within a copy to be encoded, transmitted, and decoded by a facsimile system.
Figure 1B:
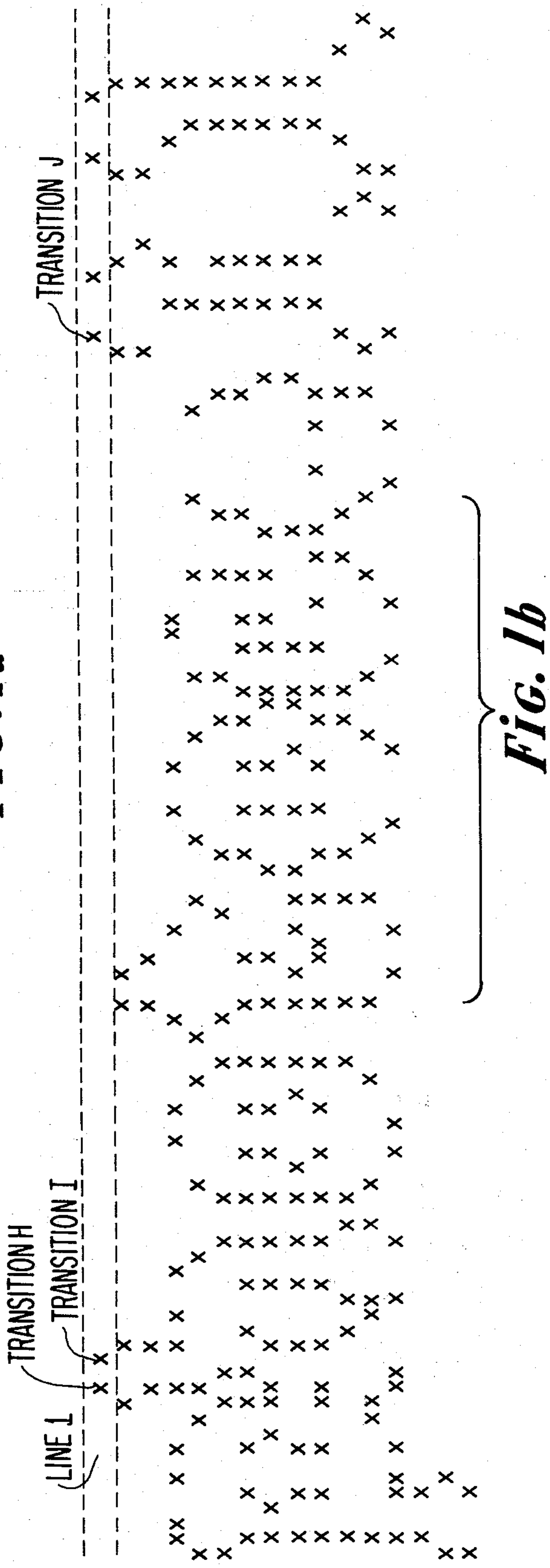
FIG. 1*b* is a pictorial representation mapping the location of transitions from white to black and black to white within the copy of FIG. 1*a*.

A graphic document can be represented by a two-dimensional array of picture elements where each picture element contains a tone. In black and white copy each picture element is either black or white. FIG. 1*a* is a graphical representation of a two-dimensional array of picture elements manifesting the word "photocell" in a black and white copy in which an X represents a black picture element. It is possible to represent the information in the array of FIG. 1*a* in transition format wherein the location of an X indicates a transition from white to black or black to white along the horizontal direction. FIG. 1*b* is a pictorial representation mapping the location of transitions in the array of FIG. 1*a*. It should be noted, referring to FIG. 1*b*, that transitions lie on closed contours and can frequently be located in reference to the preceding horizontal line. That is, transitions are frequently located directly below or below and on a diagonal immediately to the right or left of a transition in the preceding horizontal line.

The run-length/reference code dictionary of FIG. 2 makes possible the exploitation of the high degree of vertical correlation between adjacent horizontal lines by locating transitions within the current or present line with reference to transitions within the preceding line whenever possible. FIGS. 3*a* and 3*b* are useful in the explanation of run-length/reference encoding according to the dictionary of FIG. 2 and should be referred to concurrently with FIG. 2. The "1"s in the lines of FIGS. 3*a* and 3*b* represent locations of transitions ("X"s) in FIG. 1*b* and correspond to binary 1s present in the line registers of the encoder and decoder of FIGS. 4, 5, 6 and 7, as will be explained. The blank spaces between the 1s of FIGS. 3*a* and 3*b* manifest the non-occurrence of a transition and correspond to binary "0"s present in the line registers of the encoder and decoder of FIGS. 4, 5, 6 and 7. The run-length/reference code dictionary of FIG. 2 provides for line-to-line reference coding whenever a transition within the present line is directly below ("S" indicating same), below and immediately to the left ("L" indicating left) or below and immediately to the right ("R" indicating right) of a transition in the preceding line. Hexidecimal numbers 9 through F represent four-bit (binary digit) reference code-word entries. Hexidecimal numbers C, D and E represent reference code-words manifesting a single transition reference to the preceding line. For example, hexidecimal number C (S) indicates the location of a transition in the current line which is directly below a transition in the preceding line. Transitions A, B and C on the current line of FIG. 3*a* are transitions which would be encoded, according to the dictionary of FIG. 2, respectively, by reference code-words indicated by the hexidecimal numbers C, D and E following in succession. Hexidecimal numbers 9, A, B and F represent reference code-words manifesting a multiple transition reference to the preceding line. For example, hexidecimal number 9 (LS) represents the location of a transition in the current line which is below and immediately to the left of a transition in the preceding line followed by a transition in the current line, which is directly below a transition in the preceding line. Transitions D and E on the current line of FIG. 3*b* are transitions which would be encoded, according to the dictionary of FIG. 2, by the single reference code-word represented by the hexidecimal number 9 since a left (L) reference is followed immediately by a same (S) reference.

When line-to-line reference encoding is not possible because the run-length/reference code dictionary of FIG. 2 does not have a code-word to correlate the location of the transition in the current line and the transition in the preceding line, the transition in the current line is encoded by encoding the distance from the last previous transition in the same line. A run-length is usually defined in the art as a number of successive picture elements of one color or tone within a line. Run-lengths are illustrated by the distance between transitions C and F and F and G in the current line of FIG. 3*a*. Four-bit code-words represented by hexidecimal numbers 0 through 8 and eight-bit code-words represented by hexidecimal numbers 09 through EC are used to encode the distance or run-length between transitions on the same line when reference encoding is not possible Hexidecimal numbers 1 through 8 are called terminated entries because they represent run-lengths which are terminated by a transition (binary 1). Hexidecimal numbers 0 and 09 through EC are called unterminated entries because they represent run-lengths which are not terminated by a transition. A run-length is encoded by selecting one or more entries from the dictionary of FIG. 2 in sequence to construct the run-length. Thus, a run-length containing less than 8 consecutive blank spaces is encoded by a single terminated entry, while a longer run-length is formed by a combination of one or more unterminated entries followed by a single terminated entry. For example, in line 1 of FIG. 1*b*, the run-length between transition H and transition I, containing only blank or white space (binary 0) is encoded by a four-bit code word represented by the hexidecimal number 2. The run-length in line 1 of FIG. 1*b* between transition I and transition J, containing 71 white spaces, is encoded by an unterminated code-word represented by the hexidecimal number ϕA followed by a terminated code-word represented by the hexidecimal number 8.

In addition to the reference and run-length entries an eight-bit code-word represented by hexidecimal number EF is included within the dictionary of FIG. 2 to indicate both a completely blank line (a line with no transitions) and the location on the line after which no transitions follow. An EF code-word that follows any other code-word within the dictionary of FIG. 2 indicates the location on the line after which no transitions follows. A blank line is indicated by two EF code-words in succession; the first EF code-word signifying the last transition in the last line. An indication of the location on the line after which no transitions follow is necessary because the number of code-words manifesting a horizontal line is variable depending on the complexity of the line.

It should be noted that in the prior art although an EF code-word was made available for the two above-mentioned uses, it was not used to its full advantage so as to enable error detection in a simple manner and involving little additional hardware to the existing facsimile apparatus. That is, if the location of the righthand margin or other suitable terminal point of the copy is located by a reference code-word or a run-length code-word followed by an EF code-word, every picture element in a line (the distance between the copy's two vertical margins) should be accounted for when an EF code-word, hereinafter called the end-of-line code-word, is detected by the facsimile decoder utilized. If the number of picture elements at the occurrence of the end-of-line code-word is not equal to the total number of picture elements in a line, an error has occurred. It should be appreciated that although the code-words used to encode the location of the margin add additional bits which manifest no image information to the data to be transmitted, the number of additional bits are in general far fewer than the error bits added in conventional error detection schemes because of the reduction of data inherent in two-dimensional image data compression. That is, because of the correlation between lines, the margin can usually be located by a reference code-word (four bits) followed by an end-of-line code-word and at worst by one or more run-length code-words (four or eight bits) followed by an end-of-line code-word.

There are two types of transitions that cannot be encoded by line-to-line referencing utilizing the run-length reference code dictionary of FIG. 2. As an example of the first type of code-word which cannot be encoded by an entry in the dictionary of FIG. 2 reference is made to transition F of the current line of FIG. 3*a*. Transition F is neither directly below or below and immediately to the left or right of transition L in the preceding line and therefore cannot be encoded by an existing reference code-word in the dictionary of FIG. 2. Transition G is illustrative of the second type of transition which cannot be encoded by a reference code-word. Even though transition G is in the same horizontal position as transition K in the preceding line transition G cannot be referenced to transition K because no reference has been made to intervening transition L in the preceding line. In other words, reference cannot be made to a transition in a preceding line when the transition in the preceding line has not been used as a reference indicia. It will be appreciated by those skilled in the art that the dictionary of FIG. 2 may be easily modified to include reference encoding for the types of transitions just described.

It is noted that although eight-bit code-words comprise pairs of four-bit words no ambiguity occurs between four-bit code-words and eight-bit code-words in the use of the dictionary of FIG. 2 since the eight-bit code-word entries in the dictionary are formed by pairs of four-bit code-words which never occur. For example, the D code-word for a left transition reference would never be followed by the C code-word for a same transition reference because this reference pattern is encoded by the 9 code-word for a left transition reference followed by a same transition reference.

The data stream manifesting the first horizontal line consists only of run-length code-words followed by an end-of-line (EF) code-word since there is no preceding line to which reference may be made. Data streams for subsequent scan lines will consist of a mixture of reference code-words and run-length code-words followed by an end-of-line code word. When blank lines occur, the first line following them must once again be encoded using only run-length code-words.

The importance of error detection and control in two-dimensionally compressed image data facsimile apparatus will be brought out in the following example. If a 56 picture element long run-length is to be encoded by the 8-bit binary code-word 0 0 0 0 1 1 1 1 (equal to the hexidecimal number OF) is improperly encoded, transmitted or decoded as the 8-bit code-word 0 0 0 0 1 0 1 1 (equal to hexidecimal number OB), the run-length will be decoded as a run-length 24 picture elements long. Thus, a black (or white) line which is supposed to be 56 picture elements long will appear as a black (or white) line of approximately half that length because of the loss of one bit, in this case a binary 1. In addition, this error will off-set all subsequent portions of the line. Further, if reference has been made to the location of a transition in the preceding line defined by the erroneous decoded run-length, the error will be repeated throughout the copy. It should now be apparent to those skilled in he art that a critical error has occurred when one or more binary 1s are added to or deleted from a binary code-word.

DESCRIPTION OF A TWO-DIMENSIONALLY COMPRESSED IMAGE DATA ENCODER

Figure 4:
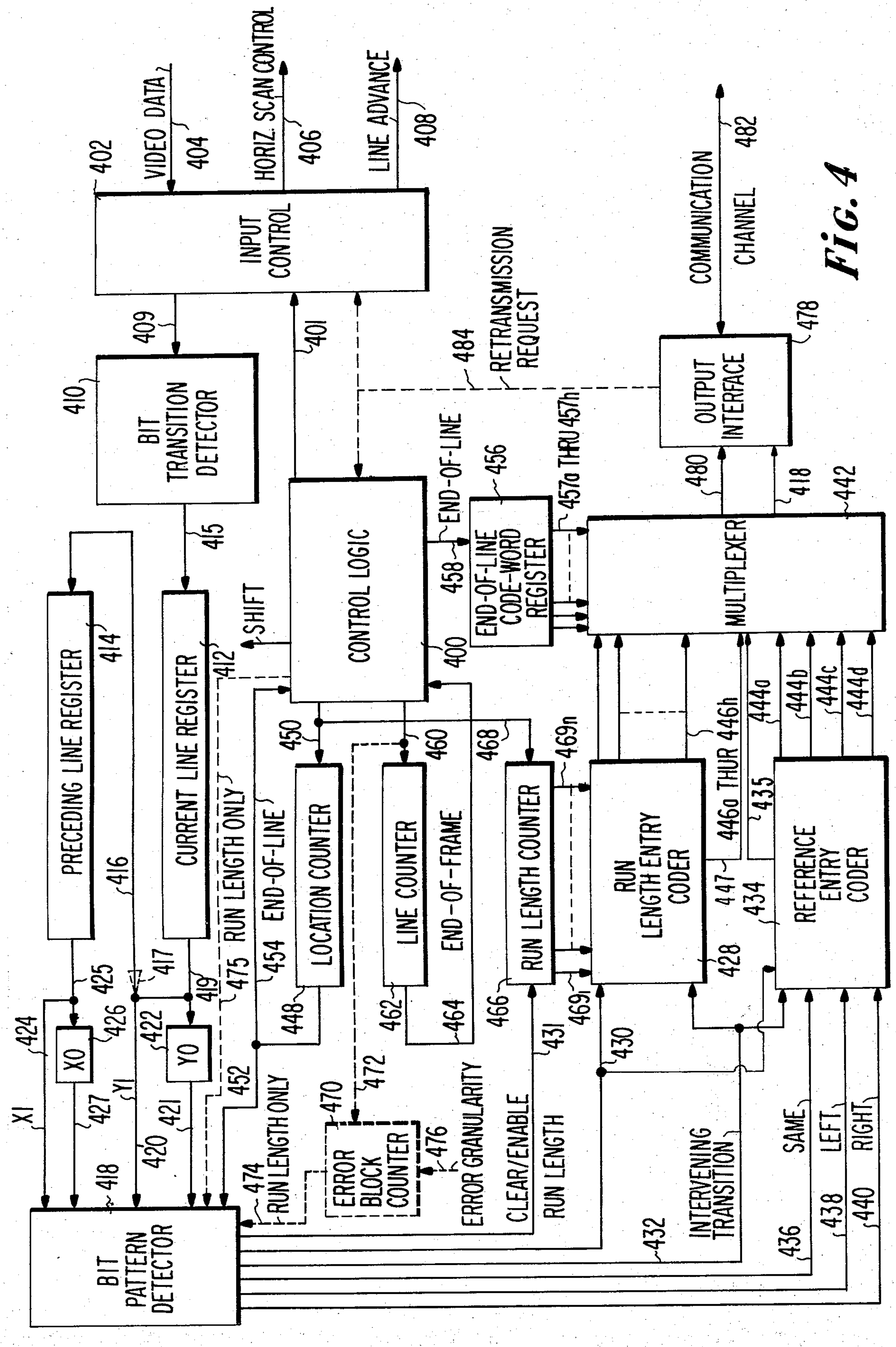
FIG. 4 is a block diagram of an encoder for encoding the information as manifested in FIG. 1*b*.

FIG. 4 is a block diagram of an encoder which may be used to encode information manifested in a copy in accordance with the run-length/reference code dictionary of FIG. 2. The encoder of FIG. 4 operates in accordance to control signals, including timing and shift pulses and signal routing commands, generated by control logic 400. Control logic 400 contains a suitable timing clock oscillator and combinational logic adapted to control the sequential operation of the decoder of FIG. 4, as will be explained. Control logic 400 controls the operation of input control 402 by signals transmitted to input control 402 through conductor 401 A suitable scanning device, such as a CRT flying spot scanner in combination with an electro-optical detector, not shown, operable in a raster scan mode, as is well known in the art, is coupled to input control 402 by video data line 404 horizontal scan control line 406 and line advance line 408. As the scanner, not shown, scans the copy in a raster scan consisting of horizontal scan lines, video data manifesting the changes in tone is transmitted to input control unit 402 through conductor 404. Since the encoder of FIG. 4 is particularly adapted to encode black and white images, the scanner, not shown, produces two-level video data, i.e., one level corresponding to black, the other level corresponding to white. It will be apparent to those skilled in the art that the scanner could be readily adapted to detect two different colors as well as two different tones. Horizontal scanning position is controlled by input control 402 which transmits horizontal positioning data to the scanning device, not shown, through scan control line 406. The scanner is controlled to scan horizontally in a discrete number of incremental steps; each step corresponding to a picture element. At the beginning of each horizontal scan line, the scanner, not shown, is vertically advanced downward uponn a command signal conducted to the scanner along line advance control line 408.

Input control unit 402 produces either a binary 1, corresponding to the black level, or a binary 0, corresponding to the white level, for each incremental picture element along a horizontal scan line and transmits this information to bit transition detector 410 through conductor 409. It will be apparent to those skilled in the art that the selection of a binary 1 to indicate black and a binary 0 to indicate white is purely arbitrary and may be reversed and that, in general, all binary signals referred to in the following description may be alternately replaced by their complements. Bit transition detector 410 determines when a stream of data from input control 402 changes from one binary number to another, i.e., the occurrence of a transition, and transmits this information in bit-by-bit fashion to current line register 412 through conductor 415. Bit transition detector 410 may for instance include a flip-flop or like logic element set by a positive-going edge and reset by a negative-going edge. For convention, the non-occurrence of a transition is indicated by a binary 0 while the occurrence of a transition is indicated by a binary 1. Current line register 412 is a shift register which contains a bit position or cell for every picture element in a horizontal scan line. Typically, a horizontal scan line is divided in one thousand picture elements and current line register 412 contains a corresponding number of bit positions. It will be appreciated by those skilled in the art that a scan line may contain more or less picture elements depending on the quality of output copy desired. Current line register 412 may be any suitable register such as a MOS shift register which is readily available in the industry. Thus, at the end of a complete scan line, current line register 412 contains information manifesting, on a bit per picture element basis, whether a transition has or has not occurred at every picture element location.

Preceding line register 414 is coupled to current line register 412 by conductor 416, and is used to store the transition pattern of the last previously scanned line. Preceding line register 414 is similar or identical in structure to current line register 412. The last bit position of current line register 412 is coupled to bit pattern detector 418 by conductor 420 and to single bit register 422 (YO) by conductor 419. Similarly, preceding line register 414 is coupled to bit pattern detector 418 by conductor 424 and to single bit register 426 (XO) by conductor 425. Both single bit registers 422 and 426 may, for instance, comprise a single memory cell such as a flip-flop. YO register 422 is coupled to bit pattern detector 418 by conductor 421. XO register 426 is coupled to bit pattern detector 418 by conductor 427. YO register 422 and XO register 426 are provided as that bit pattern detector 418 may compare the relative positions of transitions in two adjacent picture element locations as stored in the current line register 412 to transitions in the same two adjacent picture element locations in the preceding line to determine whether there is a same, left or right reference pattern. Bits are simultaneously shifted to bit pattern detector 418 and XO register 426 from preceding line register 414 and to bit pattern detector 418 and YO register 422 from current line register 412 in response to shift pulses generated by control logic 40 conducted to preceding line register 414 and current line register 412 by conductors, not shown.

Bit pattern detector 418 functions to detect whether a transition stored in current line register 412 can be encoded by a run-length code-word or a reference code-word. Bit pattern detector 418 is formed by a logic ccomparator which compares two adjacent picture elements as stored in preceding line register 414 as they are shifted into bit pattern detector 418. If bit pattern detector detects that a reference pattern exists, an appropriate signal is transmitted to reference entry coder 434 by bit pattern detector 418 along either conductor 436 (same reference pattern), 438 (left reference pattern) or 440 (right reference pattern). If no reference pattern exists, bit pattern detector transmits a clear/enable signal to run-length counter 466 along conductor 431 to initiate counting and another signal along conductor 430 to run-length entry coder 428. If a reference pattern exists but there is an intervening transition in the preceding line, a signal is transmitted to run-length entry coder 428 and to reference entry coder 434 through conductor 432 to prevent the generation of a reference code-word and to initiate the generation of a run-length code-word.

Run-length entry coder 428 and reference entry coder 434 each contain a memory such as a read-only memory to store respectively the binary run-length code-words and the binary reference code-words of the dictionary of FIG. 2. When reference entry coder 434 receives a signal from bit pattern detector 418 that a reference pattern exists along either conductor 436 (same), 438 (left) or 440 (right), the appropriate binary reference code-word is read out from the memory of reference entry coder 434 and conducted to multiplexer 442 along conductors 444*a* through 444*d* in parallel format. Four conductors, 444*a* through 444*d*, are provided to accommodate the 4-bit reference code-words of the dictionary of FIG. 2.

Run-length counter 466 is a binary counter which is used to count the number of picture elements in a run-length. Run-length counter 466 counts in response to shift pulses generated by control logic 400 and conducted to run-length counter 466 by conductor 468. These shift pulses are the same shift pulses which cause bits in preceding line register 414 and current line register 412 to be shifted from right to left toward bit pattern detector 418. Run-length counter 466 is first cleared or reset to zero and then enabled to count upon the reception of an enable/clear signal through conductor 431 from bit patttern detector 418 indicating the occurrence of a transition but that no reference pattern exists. The binary number manifesting the count is transferred in parallel format to run-length entry coder 428 through conductors $\mathbf{469}_l$ through $\mathbf{469}_n$. The subscript n indicates that the number of conductors corresponds to the number of bits in run-length counter 466 required to represent the number of no transition picture elements which may occur in a line. As in this case, if the number of picture elements in a line is one thousand, *n* is equal to 10. When run-length entry coder 428 receives a run-length command through conductor 430 or conductor 432 from bit pattern detector 418, the appropriate binary run-length code-word is read out from the memory of run-length entry coder in accordance with the count in run-length counter 466 and conducted to multiplexer 442 through conductor 446*a* through 446*n*. Eight conductors, 446*a* through 446*h*, are provided to accommodate the possible 8-bit run-length code-words of the dictionary of FIG. 2.

Location counter 448 is a binary counter which counts the number of picture elements which have been evaluated by bit pattern detector 418 and thereby determines the location of transitions within the line. Location counter 448 receives shift pulses from control logic 400 through conductor 450 and advances one count for each shift pulse received. When location counter 448 reaches a count equal to the total number of picture elements in a line (in this case a thousand), it transmits an end-of-line signal to a bit pattern detector 418 through control line 452 and back to control logic 440 through conductor 454. The end-of-line signal received by bit pattern detector 418 is interpreted by bit pattern detector as a transition and is accordingly encoded to locate the righthand margin of the copy for the purpose of error detection. Thereafter, control logic 400, in response to the end-of-line signal, transmits a signal to end-of-line code-word register 456 through conductor 458, and in response, end-of-line control word register 456 transmits an end-of-line code-word to multiplexer 442 in parallel format through conductors 457*a* through 457*h*. End-of-line code-word register 456 may be formed for example by an 8-bit register permanently set to the 8-bit binary word represented by the next-decimal number EF in accordance with the dictionary of FIG. 2.

When an end-of-line signal has reached control logic 400 from location counter 448, control logic 400 transmits a shift pulse through conductor 460 to line counter 462. Line counter 462 is a binary counter provided to count the number of lines scanned. When line counter 462 contains a binary number equal to the number of lines on a page of copy, an end-of-frame signal is returned to control logic 400 through conductor 464 to terminate scanning.

The end-of-line shift pulse on conductor 460 is also transmitted to error block counter 470 through conductor 472. Error block counter 470 is also binary counter and is shown in phantom to indicate that it is used in conjunction with one scheme of error control as will be explained with reference to FIG. 5. When error block counter 470 periodically reaches a predetermined binary number, manifesting a number of scanned lines, a run-length-only control signal is transmitted to bit pattern detector 418 through control line 474 to force bit error detector 418 to initiate only run-length encoding. The predetermined binary number set into error block counter 470 is controllable to allow for varying degrees of quality of copy and is controlled by error granularity signals conducted to error block counter 470 through conductor 476.

Arrow 417 is shown in phantom so as to indicate that data may flow in either direction through conductor 416 as will be explained in conjunction with the error control schemes associated with the decoders of FIGS. 6 and 7.

Conductor 475 is shown in phantom to indicate that it is used in conjunction with another scheme of error control as will be explained with reference to FIG. 7. Briefly, conductor 475 is used to conduct a run-length-only command from control logic 400 to bit pattern detector 418 so that a line containing an error is re-encoded for retransmission using only run-length code-words.

Multiplexer 442 formats the code-words received from run-length entry coder 428 and reference entry coder 438 into a serial data stream as is well known in the art. Multiplexer 442 transmits the serial data stream to output interface 478 through conductor 480. Output interface unit 478 formats and preconditions the serial data stream in a suitable form such as frequency shift keyed modulation for transmission in two-way communication channel 482 which may, for example, be a telephone data link.

Phantom line 484 indicates a conductor which may be used to conduct a retransmission request signal to control logic 400 in conjunction with the error control scheme of FIGS. 6 and 7 to be later explained.

Reset and some shift control lines are not shown in FIGS. 4 through 7 for simplicity of explanation. It will be understood by those skilled in the art how such connections are to be made to accomplish resetting and shifting the binary registers and counters as are shown in FIGS. 4 through 7 and whose operation is explained in the accompanying descriptions.

In operation, all the counters in the encoder of FIG. 4 are initially set to zero. Upon command from control logic 400, input control 402 causes the input scanning device, not shown, to initiate the first horizontal scan line across the copy, not shown. Two-level video data corresponding to the two tones detected by the scanning device as it sweeps horizontally across the copy is transmitted through input control 402 to bit transition detector 410, where a transition is encoded as a binary 1 and the absence of a transition is encoded as a binary 0. as the horizontal line on the copy is scanned, the absence or presence of a transition at the location of every picture element within the line is recorded and stored in current line register 412 in a bit per picture element format from left to right.

Since there is no preceding line to which reference can be made, the contents of the current line register for the first horizontal scan line must be encoded using only run-length code-words. During run-length encoding, current line register 412 is examined bit-by-bit by bit pattern detector 418. Current line register 412 is shifted into bit pattern detector 418 in a bit-by-bit fashion from right to left by shift clock pulses provided by the control logic 400. These shift clock pulses simultaneously increment location counter 448 and run-length counter 466. At any time, the binary number in location counter 448 indicates the location of the present picture element within the current line which is being examined by bit pattern detector 418. Similarly, run-length counter 466 indicates the number of picture elements between transitions or the run-length. Run-lenth counter 466 is cleared or reset to zero and then immediately enabled at the detection of a transition by bit pattern detector 418 so that it properly counts the number of picture elements within a run-length. When bit pattern detector 418 detects a transition or the end-of-line signal, the count in run-length counter 466 is used by run-length coder 428 to generate one or more run-length code-words in accordance with the dictionary of FIG. 2 by run-length coder 428. The run-length code-words are multiplexed by multiplexer 442, as is well known in the art, to form a serial bit stream manifesting the transition information of the current line encoded thus far. Output interface 478 formats the serial bit stream outputted by multiplexer 442 for transmission over a digital channel according to some suitable character transmission discipline, such as frequency shift keyed modulation, as is known in the art. At the end of one run-length, run-length counter 466 is again cleared and enabled so that it can begin counting the next run-length.

It should be noted that as the current line register is shifted to the left and examined by bit pattern detector 418, it is also loaded from right to left into preceding line register 414 for use in encoding the next line by reference encoding where possible. Run-length encoding continues until a complete line has been encoded by run-length code-words. When location counter 448 reaches a count equalling the number of picture elements in a full line, for example, in this case one thousand, control logic 400 transmits an end-of-line signal to bit pattern detector 418 which is interpreted as a transition and is thereafter encoded as such. The end-of-line signal is also transmitted to end-of-line code word register 456 to command end-of-line code-word register 456 to send the end-of-line code-word (EF) to multiplexer 442 to be added to the serial bit stream to be transmitted by output interface 478.

After the first line has been encoded with only run-length code-words, it is possible to encode the remaining portion of the copy by a combination of run-length encoding and reference encoding or by only reference encoding if successive horizontal lines are highly correlated. It should be noted that if a blank line occurs in the copy, the next successive line must be encoded by only run-length code-words to permit following lines to be encoded by reference encoding since no transitions to which reference may be made occur in a blank line.

At the end of the first and all subsequent lines, the line last encoded has been stored in preceding line register 414, line counter 462 is incremented by one, location counter 448 is cleared, and the scanning device is advanced downward to begin scanning the next horizontal line. When the next line has been converted to transition form and loaded into current line register 412, both preceding line register and current line register are shifted simultaneously bit-by-bit from right to left into bit pattern detector 418 to be concurrently examined to determine whether or not a same, left or right reference pattern exists. Single bit registers XO(426) and YO(422) are provided so that the last pair of bits from preceding line register can be simultneously compared to the last pair of bits from the current line register to determine whether the transition in the current line presently being examined can be encoded by a left or a right reference code-word. When a reference pattern is detected by bit pattern detector 418, reference entry coder 434 is alerted as to the type of reference pattern (same, left or right) detected. Reference entry coder 434 retains the information as to what type of reference pattern last occurred until the occurrence of the next reference pattern. Upon the detection of the next reference pattern, reference entry coder 434 compares the combination of the last reference pattern and the present reference pattern to the reference entry portion of dictionary of FIG. 2 to determine if a multiple reference code-word exists for that combination. If a multiple reference code-word exists for that combination, the transitions involved are encoded as a multiple reference code-word indicating a left-same, right-same, same-same or same-same-same reference pattern. For example, if a left reference pattern is detected, the signal manifesting this occurrence is stored by reference entry coder 434 until the next reference pattern is determined. If the next reference pattern detected is a same reference pattern, reference entry coder 434 recognizes that the combination of left-same exists in the dictionary of FIG. 2 and generates a left-same reference code-word. If no multiple reference code-word pattern exists, any prior reference patterns retained by reference entry coder 434 are transmitted to multiplexer 442 before the occurrence of a new transition. If no reference pattern is detected by bit pattern detector 418, the transition is encoded as a run-length code-word by run-length coder 428. Reference code-words and run-length code-words are multiplexed into a serial bit stream by multiplexer 442 as encoding of transitions recorded in current line register 414 proceeds. Examination and encoding of the current line continues in this manner with line-to-line reference encoding used wherever possible and run-length encoding used otherwise. When the location counter equals the number of elements in a full line, the location of the righthand margin of the copy, manifested by the occurrence of an end-of-line signal on conductor 452, is encoded like the location of any transition by either a run-length code-word or reference code-word and thereafter an end-of-line code-word is transferred to multiplexer 442 by end-of-line code-word register 456 to be added to the serial bit stream accumulated thus far and then to be transmitted through communication channel 482 by output interface 478. Encoding proceeds in this manner until line counter 462 reaches a predetermined number indicative of the end of the page.

DESCRIPTION OF A TWO-DIMENSIONALLY COMPRESSED DATA IMAGE DECODER

Figure 5:
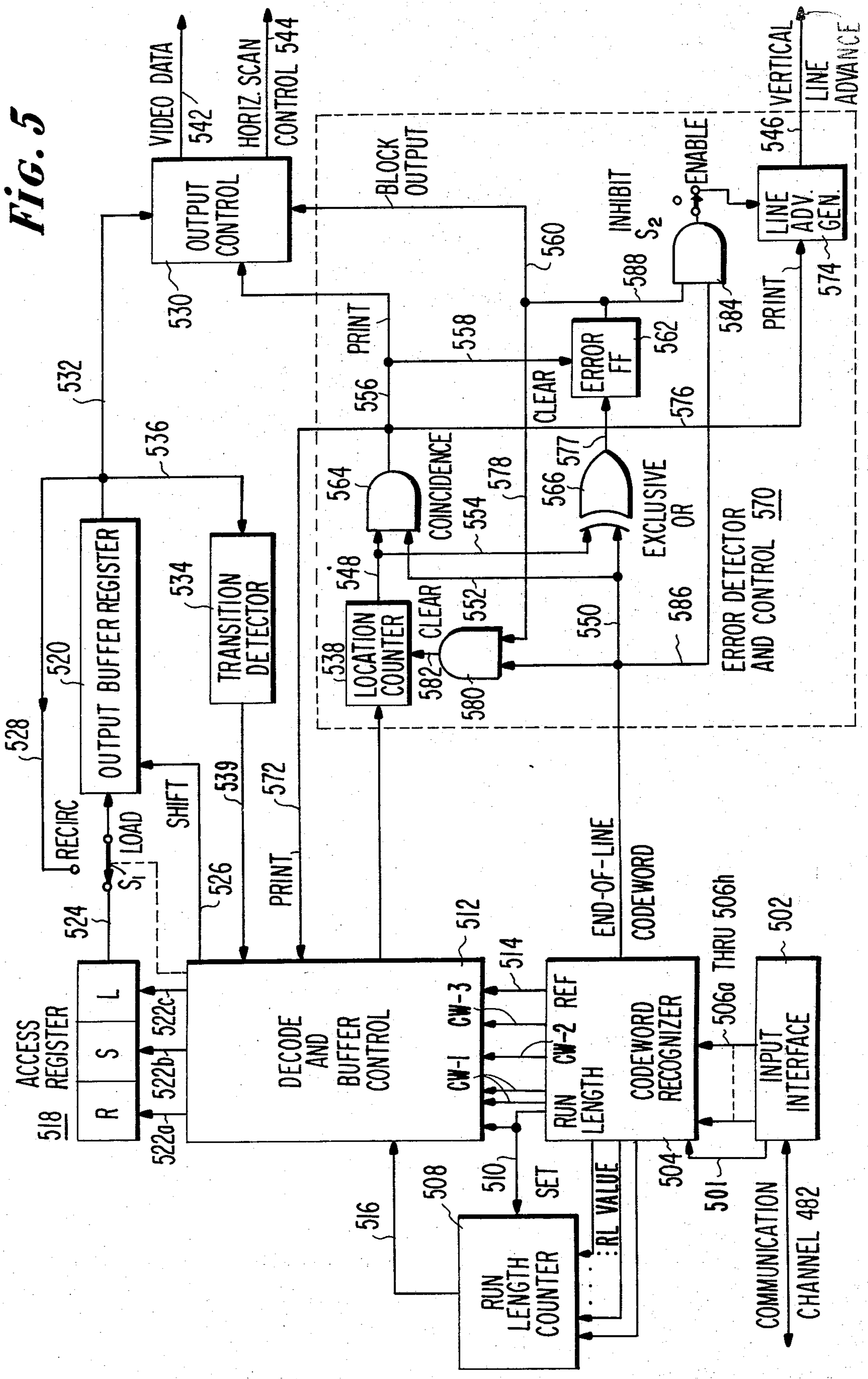
FIG. 5 is a block diagram of a decoder for decoding the information manifested in FIG. 1*b* including logic for the detection of errors incurred during its encoding transmission or decoding and logic for implementing the control of these errors without requiring the retransmission of the information in which the error was detected.

FIG. 5 is a block diagram of a decoder which may be used to decode the data transmitted through communication channel 482 of FIG. 4 and to reconstruct the copy originally scanned by the scanner of FIG. 4. Interface unit 502 receives the transmitted data in serial format from communications channel 482 and converts it to parallel format which can be categorized into either run-length, reference or end-of-line code-words by code-word recognizer 504. Input interface unit 502 contains temporary storage buffers and combinational logic to decode or strip away the transmission modulation and to perform serial to parallel data conversion as is well known in the art. The data is formatted into blocks of eight parallel bits since the code-words of the run-length/reference code-word dictionary of FIG. 2 are either 4-bit or 8-bit blocks. When the blocks of parallel bits have been formatted by input interface 502, they are transferred to code-word recognizer 504 through conductors 506*a* through conductors 506*h*. One conductor is provided for each of the eight parallel bits.

Code-word recognizer 504 contains digital comparator circuits which are responsive to the data from input interface 502 and to binary words which form the entries of the run-length reference code-word dictionary of FIG. 2. The binary words which form the entries of the dictionary of FIG. 2 may be stored in a read only memory or the like. When a match between the data from input interface 502 and a binary code-word entry is found, code-word recognizer 502 transmits a signal either to run-length counter 508, decode and buffer control 512, or along end-of-line code-word data line to error detector and control 570. Code-word recognizer 504 is coupled to run-length counter 508 through conductor 510 and to decode and buffer control 512 through conductor 514.

Run-length counter 508 is a binary counter which is used to count the number of picture elements in a run-length as is indicated by the run-length code-word recognized by code-word recognizer 504. The binary number manifesting the number of picture elements in a recognized run-length code-word is set in run-length counter 508 by a binary signal carried by conductor 510 from code-word recognizer 504. Run-length counter 508 is adapted to count down from the binary number manifesting the run-length recognized by code-word recognizer 504. Run-length counter 508 is coupled to decode and buffer control 512 through conductor 516. When the count in run-length counter 508 reaches zero, run-length counter transmits a signal to decode and buffer control 512 through conductor 516 to signify this occurrence Until the occurrence of a zero count in run-length counter 508, a shift signal or pulse is conducted to output buffer register 520 from decode and buffer control 512 by conductor 526 to shift output buffer register 520 rightward for each downward increment of run-length counter 508.

Decode and buffer control 512 is formed by switches which are operated in response to control signals conducted to decode and buffer control 512 in order to route shift signals and other instructions, as will be explained.

Access register 518 is coupled to decode and buffer control 512 by control lines 522*a* through 522*c*. Access register is a three-bit register used to insert transitions, manifested by a binary 1 into output buffer register 520, whether a run-length or reference code-word is recognized by code-word recognizer 504. The rightmost bit position (L) is coupled to the leftmost bit position of output buffer register 520 through conductor 524 and switch S1. Output buffer 520 is a shift register similar to or identical with preceding line register 414 and current line register 412 of the decoder of FIG. 4. That is, output buffer 520 may be formed by a MOS shift register and contain a thousand bit storage cells. When a run-length code-word is recognized by code-word recognizer 504 and a transition is to be inserted in the current line presently being accumulated in the leftmost portion of output buffer register 512, a signal is transmitted by decode and buffer control 512 along conductor 522*b* to set storage cell S of access register 518. When a reference code-word is recognized by code-word recognizer 504 and a transition is to be inserted in the current line present being accumulated in the leftmost portion of output buffer register 512 in relation to the location of a transition in the preceding line, as stored in the rightmost portion of output buffer register 512, as will be explained, decode and buffer control transmits a signal along either conductor 522*a*, 522*b*, or 522*c* to set respectively storage cell R, S or L of access register 518.

Transition detector 534 is coupled to the rightmost bit position of output buffer register 520 by conductor 536 to detect the occurrence of a transition in the preceding line stored in the rightmost portion of output buffer register 520. When a transition occurs, transition detector 534 transmits a signal indicating the occurrence of a transition to decode buffer control 512 through conductor 538. Transition detector 534 is used to determine the number of picture elements between transitions in the current line by determining the number of picture elements between corresponding transitions in the preceding line. Until a signal manifesting a transition is received by decode and buffer control 512, shift signals or pulses are transmitted to output buffer register 520 by decode and buffer control 512 through conductor 526 to shift output buffer register rightward. Upon reception of a signal manifesting that a transition has occurred, decode and buffer control 512 stops sending shift pulses to output buffer register 520. Transition detector 534 may be formed by a suitable storage such as a flip-flop or the like which is set in response to a binary 1, manifesting the occurrence of a transition, and which is reset in response to a binary 0, manifesting the non-occurrence of a transition.

Location counter 538 is a binary counter provided to indicate by the count contained therein the number of picture elements which have thus far been decoded and stored in output buffer register 520 at any time in the decoding process. Thus, the count in location counter 538 locates the position of the last recorded picture element in the current line. As shift pulses are transmitted to output buffer register 520 to shift the data contained therein rightward, shift pulses are also routed through decode and buffer control 512 and through conductor 540 to location counter 538. Location counter 538 is incremented upward once in response to each shift pulse received. When a line has been completely decoded, location counter should contain a count equal to the total number of picture elements in a complete line. Therefore, if there are one thousand picture elements in a line and no error in encoding, transmission or decoding has occurred, location counter should contain a count of one thousand upon completion of decoding a line. When location counter 538 reaches a count equal to the total number of picture elements in a line, location counter transmits a signal to error detector and control 570 through conductor 548 which is used to determine whether or not an error has occurred, as will be explained.

Conductor 528 is provided to allow the data stored in output buffer register 520 and manifesting transition locations in the current line to be recirculated as it is transmitted to output control 530 through conductor 532 so that it is available as data manifesting transition locations in the preceding line providing reference indices when a reference code-word is recognized and decoded. During recirculation, the original data in output buffer register 520 is rewritten in the same bit positions as it originally occupied. Each line stored in output buffer register 520 is recirculated once. Switch S1 is normally in the load position but is switched to the recirculate position in accordance with a control signal generated by decode and buffer control 512 in response to the reception of a print command received from error detection and controller 570 through conductor 572.

When error detector and controller 570 has determined that no error has occurred, as will be explained, print commands are simultaneously transmitted to decode and buffer control 512 (through conductor 572) to allow recirculation, to output control 530 (through conductor 556) to initiate writing on the output copy, and to line advance generator or one-shot circuit (via 576) to cause the generation of a line advance signal. Line advance generator 574, is coupled to the output writing device, not shown, by conductor 546 and upon the reception of a print command causes the writing device to advance vertically downward so that it is in position to write the next line. As the data in output buffer register 520 is recirculated for use in decoding the next line, it is conducted serially to output control 530 through conductor 532. As the transition data is received by output control 530, it generates a two-level video signal in response to the occurrence of transitions which is conducted to the output writing device, not shown, through conductor 542. The output writing device may for instance be a storage type of CRT capable of operating in a raster scan fashion. As the output writing device receives the two-level video data, it writes on the output copy in two tones, such as black and white, corresponding to the two levels of video data. As output buffer register 520 is shifted rightward toward output control 530, shift pulses are also conducted to output control 530 through a conductor, not shown, where they are converted to synchronization signals to synchronize the horizontal movement of the output writing device across the copy with the rightward movement of data in output buffer register 520.

The print command is generated by error detector and controller 570 after error detector and controller 570 has determined that no error in transmission has occurred. The description of the structure and operation error detector and control 570 will be deferred until the operation of the decoder portion of FIG. 5 has been described to make clear the interaction of error detector and control 570 with the decoder portion of FIG. 5 and the encoder of FIG. 4 and to clearly point out the advantages provided by error detector 570 over the prior art in the field of error detection and control in facsimile apparatus. It is to be noted that different embodiments of error detector and control 570 are shown in FIGS. 5, 6 and 7 while the decoder portion of the respective figures is essentially the same as that shown in FIG. 5. For the purpose of the description of the operation of the decoder portion of FIG. 5, it is assumed that no error has occurred and that a print command is accordingly generated by error detector and control 570.

In operation, input interface 502 receives the serial data manifesting the information as encoded and transmitted by the encoder of FIG. 4 from communication channel 482. Input interface 502 strips away the transmission modulation from the transmitted serial data and formats the received data into blocks of eight parallel bit code-words. After an 8-bit code-word has been formatted, it is transferred to code-word recognizer 504 where it is examined to determine whether it is a run-length code-word, reference code-word or end-of-line code-word. If the code-word recognized is a run-length code-word, a binary number equal to the number of picture elements in the run-length is set into run-length counter 508. As run-length counter 508 counts down, decode and buffer control 512 generates a shift pulse for each downward increment. Each shift pulse causes output buffer register 520 to shift one bit to the right. This shifting process continues until run-length counter 508 reaches a count of zero. At this point, if the run-length code-word was a terminated code-word, a binary 1 manifesting a transition is placed into the leftmost bit position of output buffer register 520 through the access register 518. If the run-length code-word was an unterminated code-word, a binary 1 is not entered into the leftmost bit position of output buffer register 520. As the run-length counter 508 counts down and output buffer register 520 is shifted right by decode and buffer control 512, location counter 538 is incremented once for each shift. At any time the binary number in location counter 438 is equal to the number of picture elements which have been decoded until that time. The first horizontal line decoded contains only run-length code-words since the first horizontal line encoded contains only run-length code-words.

When a print command signal is received by decode and buffer control 512, decode and buffer control 512 generates a signal to cause switch S1 to move from the load to the recirculate position. Simultaneously, when a print command is received by output control 530, output control 530 generates a vertical line advance signal to move the writing device vertically downward so that the writing device is in position to write the current line. Output buffer register is then shifted rightward and is thereby recirculated once as it is outputted to the recording device, not shown, through the output control 530. Video data line 542 resides at one level, causing the recording device to write for example in black on the output copy, until output buffer register 520 outputs a binary 1, manifesting a transition and causing video data line 542 to reside at the second level thereby causing the output device to write white until the occurrence of the next transition. Scan control signals on scan control line 544 generated in synchronism with the shift pulse to shift output buffer register 520 keep the recording device in synchronism with the rightward shifting of output buffer register 520.

After the first and all subsequent lines, because of the recirculation of output buffer register 520, output buffer register 520 contains the transition information, on a bit per picture element basis, manifesting the preceding line. The second and subsequent lines may contain a mixture of both run-length and reference code-words. In the second and subsequent lines, run-length decoding is performed in the same manner as just described for the first line. When a reference code-word is recognized by code-word recognizer 504, output buffer register 520 is shifted to the right until a transition is detected at the rightmost bit position of output buffer register 520 by transition detector 534. This detected transition corresponds to the transition in the preceding line to which reference will be made to locate the transition in the current line now being recorded in output buffer register 520. Depending on the reference code-word detected by code-word recognizer 504, a transition is entered in access register in the appropriate bit position, i.e., the same (S), the right (R) or the left (L). Therefore, as the contents of access register 518 are shifted into output buffer register 520, the transition in the current line is properly located in relation to the transition in the preceding line. If the reference code-word was a multiple reference code-word, this last-mentioned process is repeated for as many transitions in the preceding line as is necessary. As decoding proceeds, the right end of output buffer register 520 contains portions of the preceding line while the left end of output buffer register 520 contains portions of the current line.

When a print command signal is again received by decode and buffer control 512, switch S1 is again switched to the recirculated position and output buffer register 520 is simultaneously recirculated and outputted to the output writing device, not shown, as was previously described. The process continues until an entire page has been written on the output copy.

Figure 6:
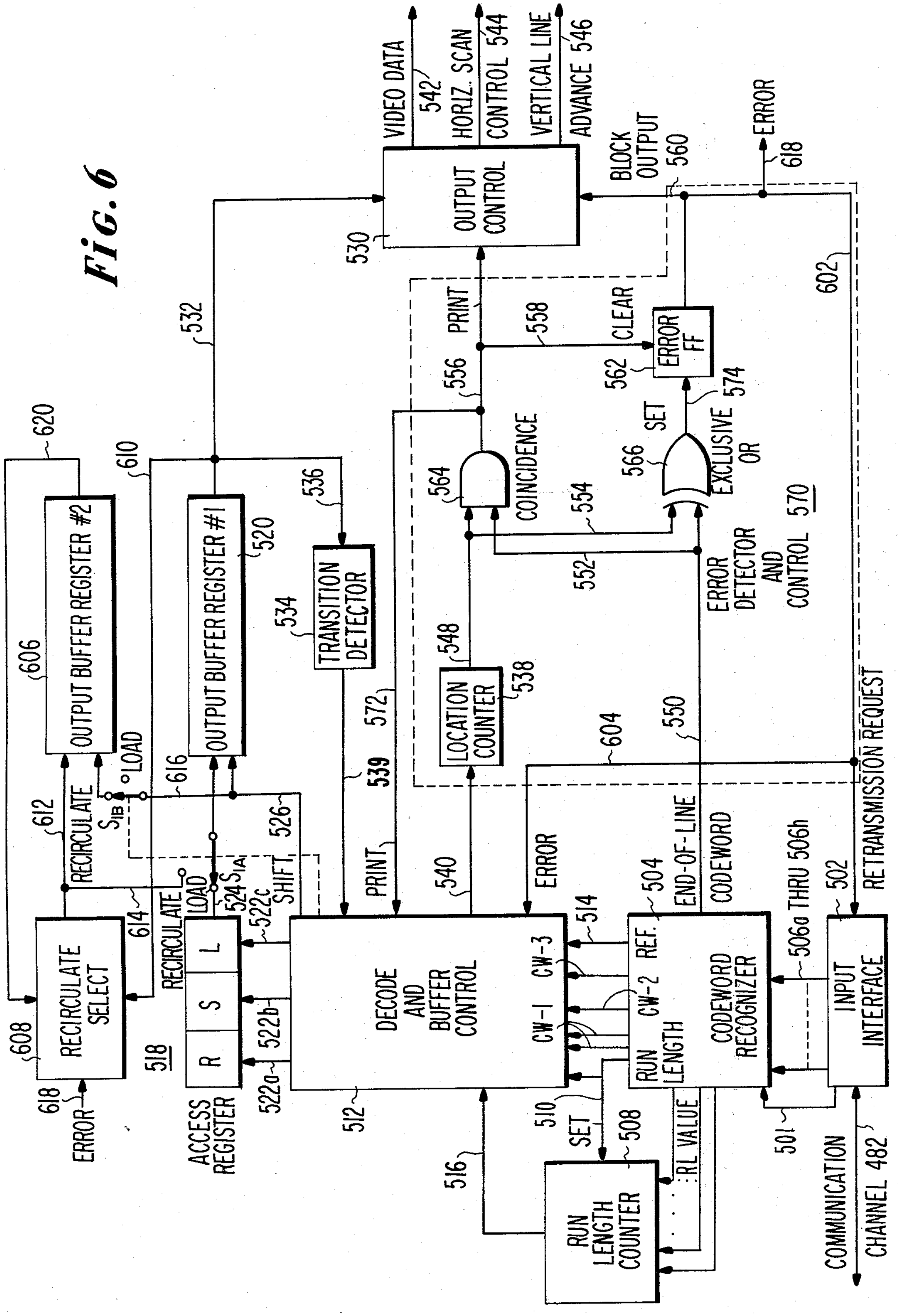
FIG. 6 is a block diagram of a modified form of the decoder of FIG. 5 for implementing the control of errors by requesting the retransmission of the information in which the error was detected.
Figure 7:
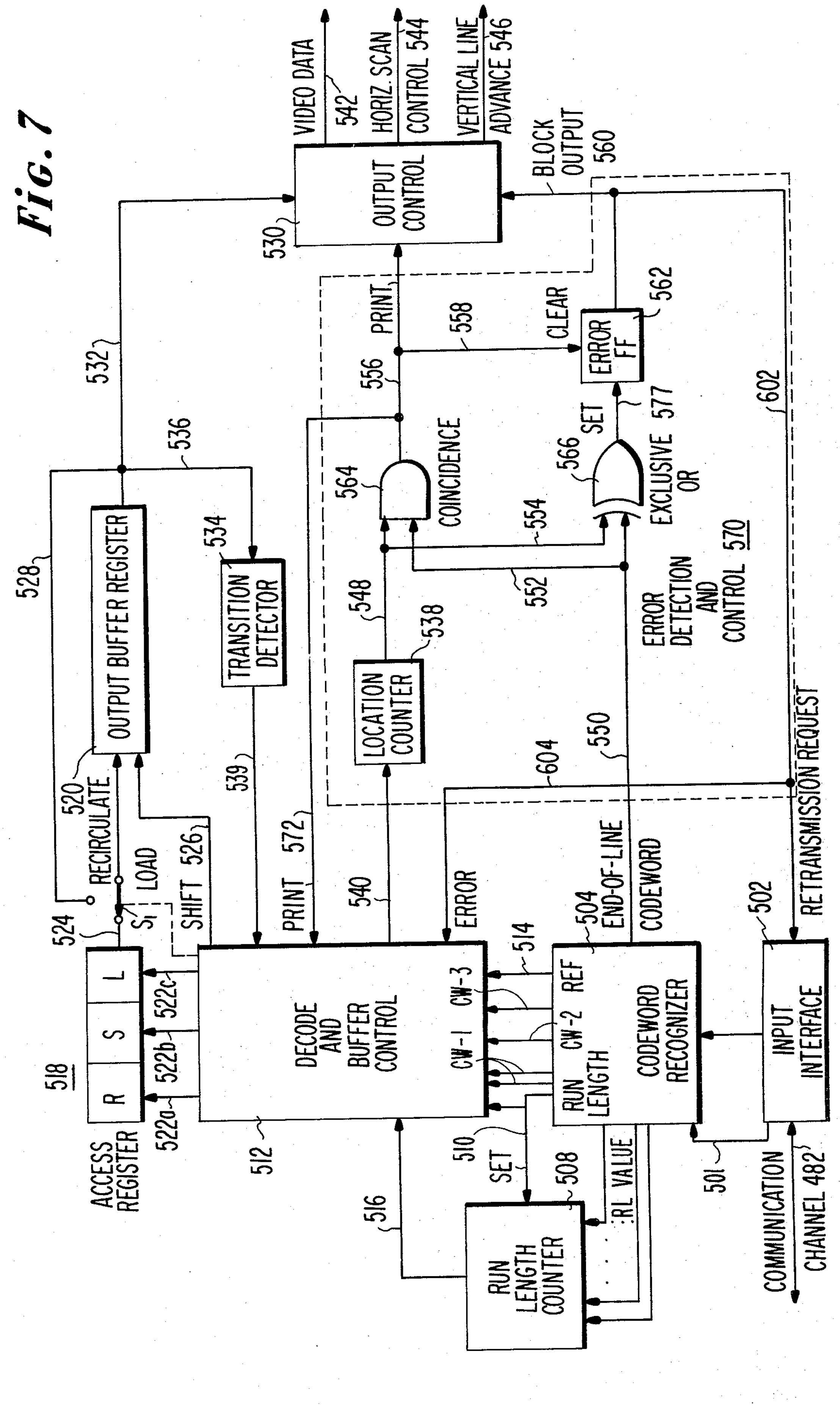
FIG. 7 is a block diagram of another modified form of the decoder of FIG. 5 for implementing the control of errors by requesting the retransmission of the information in which the error was detected.

DESCRIPTION OF THE ERROR DETECTOR AND CONTROLLER OF THE DECODERS OF FIGS. 5, 6 AND 7

Error detector and controller 570 of FIG. 5 is connected as an integral part of the decoder of FIG. 5 and functions to detect the occurrence of an error and to initiate corrective action if an error has occurred. Location counter 538, as was previously described, is a binary counter which is incremented each time output buffer register 520 is shifted rightward. After decoding a complete line, if no error has occurred, output buffer register 520 contains transition data manifesting a complete line and location counter 538 contains a binary number equal to the number of picture elements within a complete line. When the number in location counter 538 has reached the number equal to the number of picture elements in a complete line, location counter 538 transmits a pulse, hereinafter called the complete line pulse, to AND gate 564 through conductor 548 and to EXCLUSIVE OR gage 566 through conductor 554. When an end-of-line is detected or recognized by code-word recognizer 504, a pulse, hereinafter called the end-of-line pulse, is conducted to AND gate 564 through conductor 552 and to EXCLUSIVE OR gate 566 through conductor 550. It should be remembered that an AND gate is a logic element which produces a binary 1 output level only when all of its inputs are at a binary 1 level. Therefore, the output of AND gate 564 resides at a level manifesting a binary 0 until the simultaneous occurrence of the end-of-line pulse and complete line pulse. Upon the simultaneous occurrence of the end-of-line pulse and the complete line pulse, a pulse, hereinafter called the print pulse, rising to the level of a binary 1, is generated at the output of AND gate 564. It should also be remembered that an EXCLUSIVE OR gate is a logic element which produces a binary 1 output level only when one of its inputs is at a binary 1 level. Therefore, the output of EXCLUSIVE OR gate 566 resides at a low level manifesting a binary 0 until either the end-of-line pulse or the complete line pulse occurs without the occurrence of the other. Upon the non-simultaneous occurrence of the end-of-line pulse and the complete line pulse, a pulse rising to the level of a binary 1 is generated at the output of EXCLUSIVE OR gate 566 and manifests the occurrence of an error. The output signal of AND gate 564 is conducted to decode and buffer control 512 through conductor 572, to output control 530 through conductor 556, to the clear input of error flip-flop 562 through conductor 558 and to line advance generator 574 through conductor 576.

The output signal of EXCLUSIVE OR gate 566 is coupled to the set input of error flip-flop 562 through conductor 577. Error flip-flop 562 may be any suitable flip-flop such as a set-reset (S-R) flip-flop or the like. The application of a binary 1 to the set input of error flip-flop 562 will set the output of error flip-flop 562 to a binary 1 whereas the application of a binary 1 to the clear or reset input of error flip-flop 562 will reset the output of error flip-flop 562 to a binary 0. A binary 1 at the output of error flip-flop 562 manifests the occurrence of an error whereas a binary 0 at the output of error flip-flop 562 manifests the non-occurrence of an error. The output of error flip-flop 562 is coupled to output control 530 through conductor 560, to AND gate 584 through conductor 588 and to AND gate 580 through conductor 578. When error flip-flop 562 is set output control 530 is prevented from causing the data accumulated in output buffer register 520 to be written on the output copy.

AND gate 584 is coupled through switch S2 to line advance generator 574. Line advance generator 574 transmits a signal through vertical line advance control line 546 to the output writing device to cause it to advance incremently downward one line in response to a print pulse on conductor 576 if no error has occurred or, when switch S2 is in the enable position, error flip-flop 562 is set, manifesting the occurrence of an error, and an end-of-line pulse occurs on conductor 586. If switch S2 is switched to the inhibit position, the generation of an end-of-line pulse during an error condition will not cause the output writing device to advance incrementally downward, as will be explained.

One input of AND gate 580 is connected to the output of error flip-flop 562 through conductor 578 while the other input of AND gate 580 is connected to code-word recognizer 504 through conductor 551. The output of AND gate 580 is connected to location counter 538 through conductor 582 and serves to conduct a clear pulse to location counter 538 when the end-of-line pulse occurs and error flip-flop 562 is set. When location counter 538 is cleared, the count in location counter 538 is set to a binary number equal to zero.

In operation, error detection is accomplished in the decoders of FIGS. 5 through 7 by comparing the occurrence of an end-of-line pulse (on conductor 550) generated by code-word recognizer 504, when it recognizes the end-of-line code-word, with the occurrence of a complete line pulse (on conductor 548) generated by location counter 538 when it reaches a count equal to the total number of picture elements in a line. These two signals should coincide when the serial data stream manifesting a line has been decoded. If either of these pulses occurs before the other, an error has occurred and error control is initiated by error detector and control 570, as will be explained. Thus, the simultaneous occurrence of the complete line pulse and the end-of-line pulse causes a print pulse to be generated by AND gate 564 enabling the recirculation of output buffer register 520 and the writing of the current line on to the output copy, while the non-simultaneous occurrence of the complete line pulse and the end-of-line pulse causes EXCLUSIVE OR gate 566 to generate a pulse to set error flip-flop 562 thereby inhibiting the writing of the current line on to the output copy and initiating the various error control processes to be described.

Therefore, it should now be apparent to those skilled in the art that the error detection portion of error detector and control 570 accounts for virtually every possible error in the encoding, transmission and decoding of two-dimensionally compressed image data facsimile apparatus of FIGS. 4 through 7 by determining if the number of picture elements which have been decoded upon the occurrence of an end-of-line pulse is equal to the total number of picture elements in a complete line. That is, if a transition is improperly located in a current line either by an error in a run-length code-word or reference code-word, the number of picture elements in the location counter will be too large or too small at the occurrence of an end-of-line pulse. Using this error detection technique, only certain compensating types of errors will go undetected. For example, if one error elongates a run-length while another error shortens another run-length by the same amount, the errors will compensate for one another and, therefore, go undetected. It is to be noted that the occurrence of compensating errors is highly improbable.

Error control is accomplished in one of two ways. The configuration of error detector and control 570 of FIG. 5 is arranged to provide for the deletion of lines containing errors without replacement. It is noted that depending on the quality of copy desired deletion of erroneous lines may be hardly noticeable, if at all. The configurations of error detector 570 of FIGS. 6 and 7, to be later described, are alternate arrangements providing for the retransmission of data for erroneous lines.

Figure 8A:
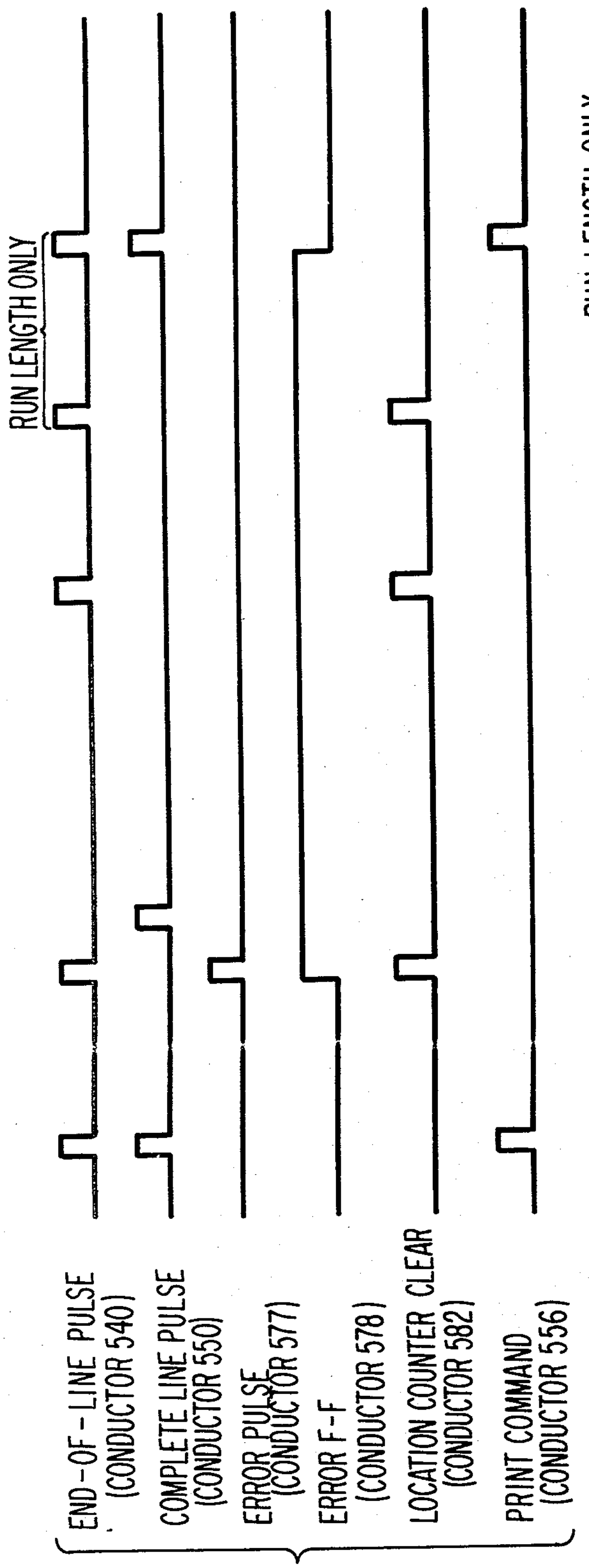
FIGS. 8*a* and 8*b* are timing diagrams useful in understanding the error detector and controller of FIG. 5.
Figure 8B:
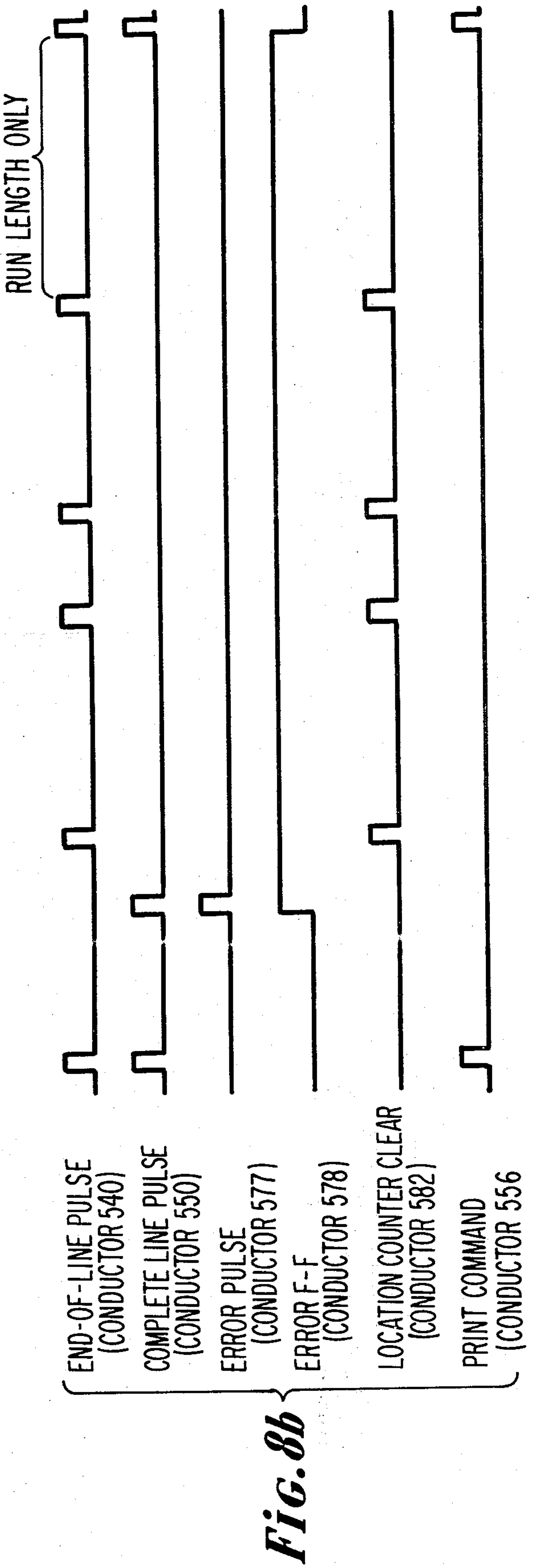

In order to facilitate the understanding of the operation of the error control portion of error detector and controller 570 of FIG. 5, concurrent reference should be made to FIG. 5 and FIGS. 8*a* and 8*b*. FIG. 8*a* is a timing diagram of the operation of error detector and controller 570 when the end-of-line pulse precedes the complete line pulse, while FIG. 8*b* is a timing diagram of the operation of error detector and controller 570 when the complete line pulse precedes the end-of-line pulse. It is interesting to note that the end-of-line pulses occur at random intervals since the serial bit stream of code-words representing a line vary in length depending on the complexity of the line.

The operation of error detector and control 570 in FIG. 5 follows.

Preliminarily, it should be noted that as long as reference encoding is used to encode even a portion of a line, there must be an accurate preceding line to which transitions in the current line mayu be relatively located. Therefore, if an error is detected during the accumulation of data forming a current line in output buffer register 520 (this data forming the preceding line upon the recirculation of output buffer register 520), succeeding lines after the erroneous line should not be decoded unless they have been encoded by run-length code-words only to avoid decoding succeeding lines based on a reference line which is inaccurate. Accordingly, in conjunction with error detector and controller 570 of FIG. 5 only, error block counter 470 is provided in the encoder of FIG. 4 to ensure that lines are periodically encoded by only run-length code-words. For example, error block counter may be set to count up to a binary number equal to ten and then transmit a run-length code-word only command signal to bit pattern detector 418 by application of a suitable signal to error granularity line 476. Therefore, every tenth line is encoded using run-length code-words only.

For the following description, it will be assumed that switch S2 is in the enable position. When an error is detected, error flip-flop 562 is set. In response to a set condition of error flip-flop 562, manifest by a binary 1 at the output of error flip-flop 562, a block output signal is conducted to output control 530, one input of AND gate 580 resides at a binary 1 thereby enabling the clear input (conductor 582) of location counter 538 and one input of AND gate 584 resides at a binary 1 enabling line advance generator 574. In response to the block output signal, output control 530 prevents the writing of the current line in output buffer register 520 on to the output copy. Once the clear line of location counter 538 is enabled, each end-of-line pulse from code-word recognizer 504 will reset or clear location counter 538. In other words, during an error condition, the beginning decoding operation of the decoder of FIG. 5 is synchronized with the occurrence of the end-of-line pulse. It should be noted that if no error has occurred, the decoding operation begins when the count in location counter 538 passes from a count equal to the total number of picture elements in a line to a count equal to zero. Once line advance generator is enabled, each end-of-line pulse from code-word recognizer 504 will cause a vertical line advance signal to be generated causing the output writing device to move one line downward for each omitted line thereby causing the output copy to exhibit a blank portion within the image printed since the video data is blocked or inhibited. Error flip-flop 562 remains set as long as the end-of-line code pulse and complete line pulse do not occur simultaneously.

Since the last line stored in output buffer register 520 includes an error subsequent lines using reference code-words when decoded will also contain an error and in general error flip-flop 562 will not be reset until the encoder of FIG. 4 inserts a line coded with only run-length code-words. If the run-length only line is free of error, the end-of-line pulse and complete line pulse will occur simultaneously and error flip-flop 562 will be reset by the print command generated by AND gate 564 and the data accumulated in output buffer register 520 is outputted through output control 530. It should be noted that it is possible for the system to resynchronize itself before the encoder of FIG. 4 generates one of the periodic run-length-only lines but this occurrence is highly improbable.

Two modes of operating error detector and controller 570 of FIG. 5 are available for locating the omitted or blank lines generated because of the presence of an erroneous line. In the first mode of operation, as was previously explained, where switch S2 is manually placed in the enable position, the output copies will have a number of blank lines (equal to the number set in error block counter 470 of FIG. 4) within the printed matter indicative of the occurrence of an error. This mode may be more preferable than the second mode to be described when high quality copy is required because there is a positive indication in the output copy of the occurrence of an error to alert the operator so that he may manually request another copy to be transmitted.

In the second mode of operation, error detector and control operates in all respects as in the first mode except that switch S2 is manually placed in the inhibit position thereby preventing line advance generator 574 from receiving end-of-line pulse through AND gate 584 so that the output writing device is not advanced downward during the occurrence of omitted lines. As a result, the output copy will contain printed portions which are compressed in the vertical direction in areas where an error has occurred and a number of blank (equal to the number set in error block counter of FIG. 4) lines in the bottom margin indicative of the occurrence of an error. It is to be noted that depending on the number of lines per vertical distance the compressed error area may hardly be noticeable.

The decoder of FIG. 6 is identical to the decoder of FIG. 5 with respect to the structure for decoding and error detection, as is indicated by the structure identified by the 500 series reference numbers, but is different from the decoder of FIG. 5 in providing structure for implementing the retransmission of a line in which an error has been detected as is indicated by the structure identified by the 600 series reference numbers. In particular, the decoder of FIG. 6 differs from the decoder of FIG. 5 in that conductor 602 is connected between the output of error flip-flop 562 and input interface 502 so that a retransmission request signal may be transmitted to the encoder of FIG. 5 upon the detection of an error and output buffer register No. 2 606, recirculate select 608 and switches S1A and S1B are provided to accommodate the storage of the last error-free line so that a retransmitted signal containing reference code-words may be decoded upon the detection of an error during the decoding of a current line.

Output buffer register No. 2 606 is a shift register similar to or identical with output buffer register No. 1 520 and contains a number of storage cells or bit positions equal to the number of picture elements in a complete line. The rightmost bit position of output buffer register No. 2 606 is connected to one input of recirculate select 608 through conductor 620. The rightmost bit position of output buffer register No. 1 520 is connected to another input of recirculate select 608 through conductor 610. The output of recirculate select 608 is connected to the leftmost bit position of output buffer No. 2 606 through conductor 612 and to the recirculate position of switch S1A through conductor 614. Recirculate select 608 may be a single-pole double-throw switch or any other suitable device which performs the same function as a single-pole double-throw switch. The signal which controls the position of single-pole double-throw recirculate select 608 is conducted to recirculate select 608 through conductor 618 from the output of error flip-flop 562. When error flip-flop 562 is set, manifesting the occurrence of an error, a continuity path is formed within recirculate select 608 between conductor 620 and conductors 612 and 614. When error flip-flop 562 is not set, manifesting the non-occurrence of an error, a continuity path is formed within recirculate select 608 between conductor 610 and conductors 612 and 614.

Switches S1A and S1B are operated synchronously, that is, they are in the recirculate position at the same time and in the load position at the same time. When switch 1B is in the recirculate position, shift pulses which shift output buffer register No. 2 606 rightward are conducted to output buffer register No. 2 606 through conductor 616 to shift output buffer register No. 2 606 rightward simultaneously. The interaction of output buffer register No. 1 and output buffer register No. 2 will be explained in description of the operation of the error control portion of the decoder of FIG. 6.

Figure 9:
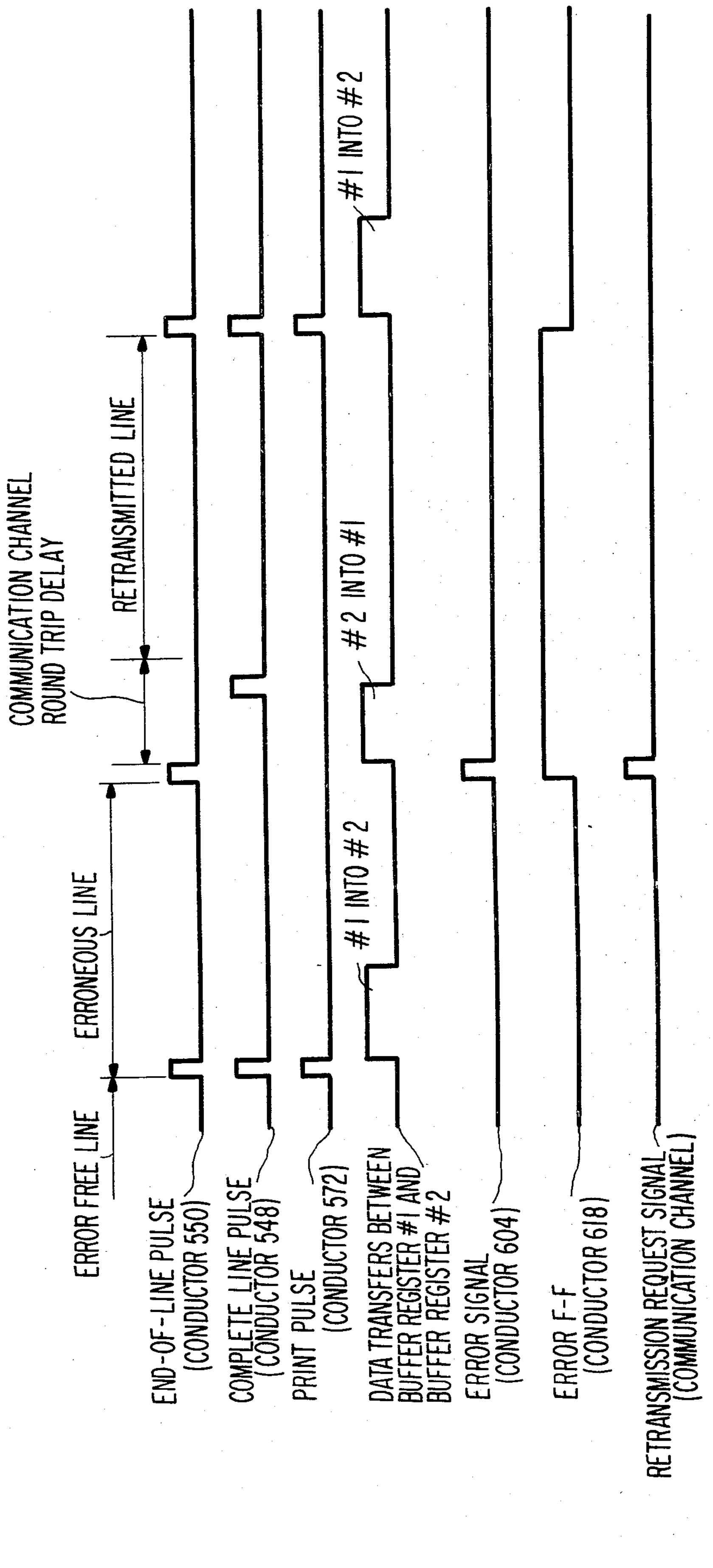
FIG. 9 is a timing diagram useful in understanding the error detector and controller of FIG. 6.

In operation error detector and control 570 of the decoder of FIG. 6 detects errors in the same manner as does error detector and controller 570 of FIG. 5; however, error control is accomplished by requesting retransmission of the erroneous lines. Concurrent reference to FIG. 6 and FIG. 9 should be made during the following description. FIG. 9 is a timing diagram of the error control operation of the decoder of FIG. 6. The decoding operation of the decoder of FIG. 6 proceeds in the same manner as the decoding operation of the decoders of FIG. 5 so that when no error has been detected, as indicated by the simultaneous occurrence of the end-of-line pulse and complete line pulse, a print command is generated at the output of AND gate 564 causing switches S1A and S1B to switch from the load position to the recirculation position. Since no error has occurred, the signal at the output of error flip-flop 562 (conductor 618) has caused a path to close between conductor 610 and conductors 612 and 614 within recirculate select 608 thereby enabling the stored transition data within output buffer register No. 1 520 to be loaded into output buffer register No. 2 606 as it is recirculated and outputted. When switch S1B is in the recirculate position shift pulses to shift data in output buffer register No. 1 520 rightward also shift data in output buffer register No 2 606 rightward. Thus, after a line has been recirculated it appears both in output buffer register No. 1 520 for use in decoding the next line and in output buffer register No. 2 606 for use in decoding the next line and in output buffer register No. 2 606 for use in decoding a retransmitted line if an error occurs. Output buffer register No. 2 606 is necessary because once an error has been detected the last error-free line has already been outputted from output buffer register 520 and the erroneous line has already been stored in output buffer register 520 and cannot be used for decoding the retransmitted line if the retransmitted line contains reference code-words without propagating the error down the output copy.

When an error occurs, flip-flop 562 is set inhibiting the operation of output control 530, causing an error signal to be transmitted to decode and control buffer 512, causing a retransmission request signal to be sent to the encoder of FIG. 4 and causing a path between conductor 620 and conductors 612 and 614 to be closed by recirculate select 608 so that the contents of output buffer register No. 2 606 may be loaded into output buffer register No. 1 520. In response to the reception of an error signal, decode and buffer control 512 causes switches S1A and S1B to switch to the recirculate position and generates a sufficient number of shift pulses to load the contents of output buffer register No. 2 606, containing the last valid line, into output buffer register No. 1 520 for use in decoding the reference code-words in the subsequently retransmitted line. When output buffer register No. 2 606 is loaded into output buffer register No. 1 512, it is also recirculated into itself for use in decoding a second retransmitted line if the first retransmitted line contains an error.

When the retransmission method of error control is utilized, provisions must be made in the encoder of FIG. 4 to encode the erroneous line again and retransmit it. If the retransmitted line is to be encoded using reference code-words the last preceding line and the next-to-last preceding line must both be available within the encoder of FIG. 4. This may be accomplished, for example, by expanding preceding line register 414 to accommodate both the last preceding line and the next-to-last preceding line or in any other suitable memory register. If both the last and next-to-last preceding lines are stored in preceding line register 414 when a retransmission signal is received by the encoder of FIG. 4, control logic 400 causes the last preceding line to be transferred to current line register 412 while the next-to-last preceding line remains in the preceding line register and encoding the data now in the current line register manifesting the line in which the error has occurred follows in the normal manner. When encoding is completed, the re-encoded data is retransmitted to the decoder of FIG. 6.

Alternative to storing both the last preceding line and the next-to-last preceding line, the erroneous line can be re-scanned and then re-encoded. In this case, when a retransmission signal is received by the encoder of FIG. 4, control logic 400 causes the scanner to be incremented upward by one line and to re-scan the line in which an error has occurred. When the line in which the error has occurred has been re-scanned and loaded into current line register 412 in transition form encoding proceeds as before. When encoding is completed the re-encoded data is retransmitted to the decoder of FIG. 6.

When the retransmitted data manifesting the line in which the error has occurred is received and decoded by the decoder of FIG. 6, error flip-flop 562 is reset if no error is detected and the data is outputted as before.

The decoder of FIG. 7 is identical to the decoders of FIGS. 5 and 6 with respect to the structure for decoding and error detection, as is indicated by the structure identified by the 500 series reference numbers, and is identical to the decoder of FIG. 6 with respect to the structure to generate a retransmission request signal, as is indicated by the structure identified by the 600 series reference numbers, but is different from the decoder of FIG. 6 in that no provision is made to store the last error-free line before the occurrence of the erroneous line so that the retransmitted line must be encoded using only run-length code-words upon the detection of an error.

The operation of the decoder of FIG. 7 is identical to the operation of the decoders of FIGS. 5 and 6 with regards to decoding and error detection. Like error detector and controller 570 of FIG. 6, error detector and controller 570 of FIG. 7 requests the retransmission of the line in which an error has been detected. However, because the decoder of FIG. 7 requests the retransmitted line to be encoded by run-length code-words only, output buffer register No. 2 606 of FIG. 6 is not required in the decoder of FIG. 7.

When the retransmission request signal is received by the encoder of FIG. 4, control logic 400 transmits a run-length-only signal to bit pattern detector 418 and generates sufficient shift pulses to transfer the preceding line transition data, manifesting the line in which an error has occurred, stored in preceding line register 414, to current line register 412. Thereafter, the data in current line register 412 is encoded using only run-length code-words and retransmitted to the decoder of FIG. 7. Alternately, the line in which the error has occurred may be re-scanned, by causing the scanner to move one line upward in response to the reception of the retransmission request signal, before re-encoding and retransmission.

When the retransmitted data manifesting the line in which the error has occurred is received and decoded correctly by the decoder of FIG. 6, error flip-flop 562 is reset if no error is detected and the data is outputted as before.

Figure 10:
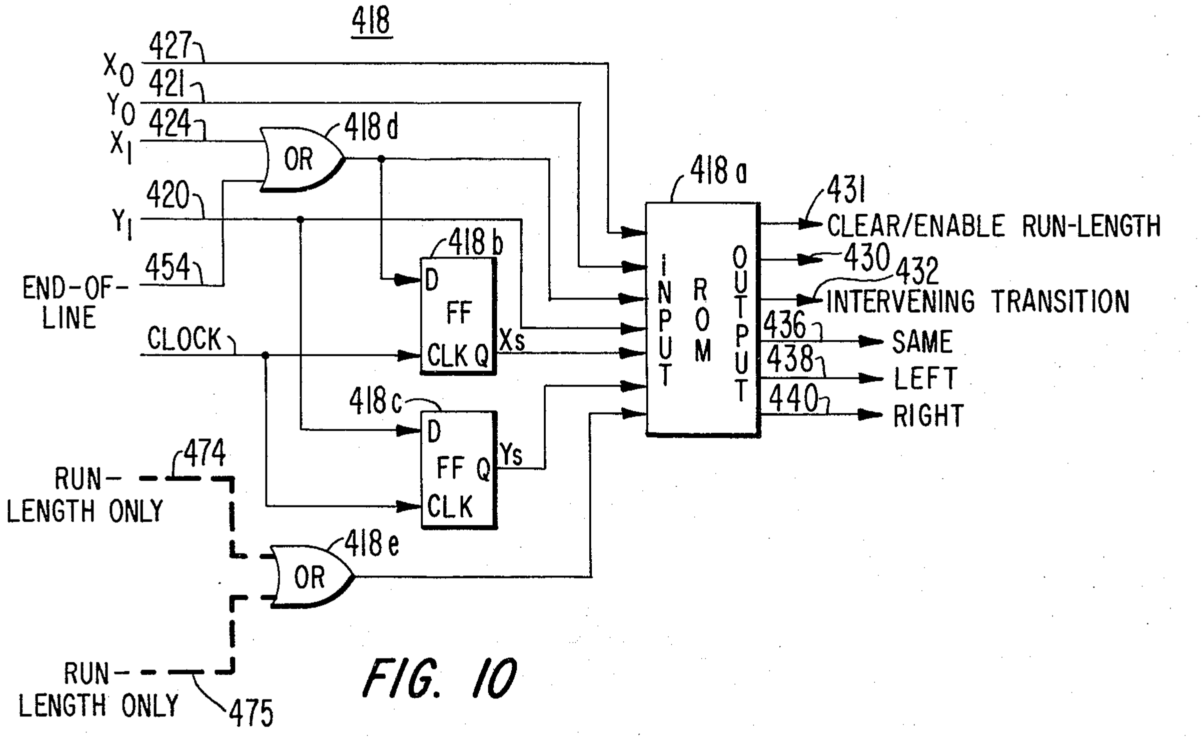
FIG. 10 is a diagram of a specific implementation for the Bit Pattern Detector shown in FIG. 4.
Figure 10B:
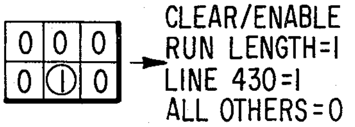
FIGS. 10*a*–10*d* are diagrams helpful in the explanation of FIG. 10.
Figure 10C:
Figure 10D:
Figure 10A:
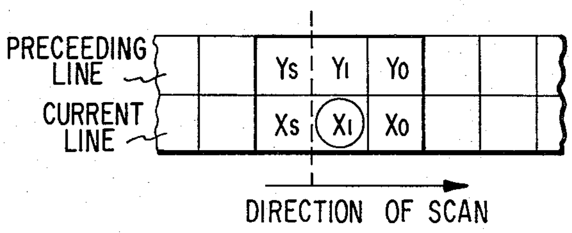

Referring now to FIG. 10, the details for the implementation of Bit Pattern Detector 418 are shown. Bit Pattern Detector 418 includes a read-only-memory (ROM) **418*a* which is arranged to examine a 3 by 2 bit array for certain patterns. A generalized array is shown in FIG. 10*a*.**

The circle around element XI in FIG. **10*a* indicates the element which is being encoded. The Bit Pattern Detector 418 examines three bits in the preceding line to determine if a left, same, or right (i.e. YS=1, Y1=1 or Yo=1 respectively) reference is possible. Thus, in FIG. 10, in addition to Xo, Yo, and X1, Y1 two D type flip-flops, 418*b* and 418*c*, are included in the detector 418** to store Xs and Ys respectively.

OR gate **418*d* is provided to force X1 to a logic 1 state when an end-of-line signal on line 454 is present. OR gate 418*e* combines the signals on lines 474 and 475 and provides the combined signal to one of the input terminals of ROM 418*a*.**

FIGS. **10*b*–10*d* show examples of the types of output signals provided by ROM 418*a*** in response to the input conditions shown within the boxes. Again, the circled character represents the element being encoded.

Figure 11:
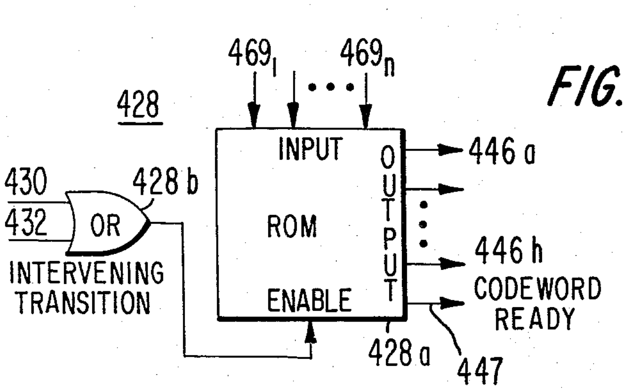
FIG. 11 is a diagram of a specific implementation for the Run Length Entry Coder shown in FIG. 4.

Referring now to FIG. 11, the details of the implementation for Run Length Entry Coder 428 are shown. Run Length Entry Coder 428 includes a ROM **428*a*** which is an *n* by 8 bit ROM, where *n* is equal to the number of stages in the run length counter 466. ROM **428*a* is activated via OR gate 428*b* by either a signal on line 430, indicating no reference is possible, or by a signal on line 432, indicating an intervening transition. The code-word from ROM 428*a* is provided at the output lines 446*a* to 446*h* and a code-word ready signal is provided on line 447. The ROM 428*a* is arranged to translate a run length count into a code-word in accordance with the code-word dictionary shown in FIG. 2.**

Figure 12:
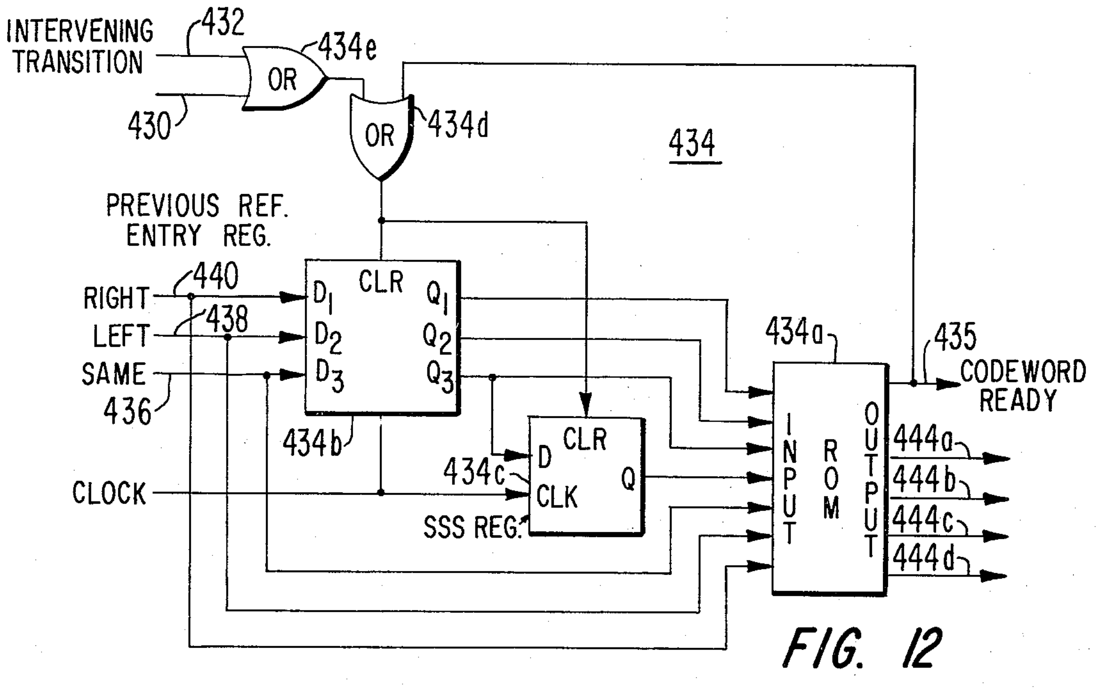
FIG. 12 is a diagram of a specific implementation for the Reference Entry Coder shown in FIG. 4.

Referring now to FIG. 12, the details of the implementation for Reference Entry Coder 434 are shown. Reference Entry Coder 434 translates the occurrence of single and multiple reference entries into code-words in accordance with the dictionary of FIG. 2. Reference Entry Coder 434 comprises a ROM 434*a*, registers 434*b* and 434*c* and OR gates 434*e* and 434*d* connected as shown in FIG. 12. The translation function provided by ROM 434*a* is accomplished by providing input signals thereto comprising the current reference entry from lines 440, 438 and 436 and the previous reference entry which is stored in register 434*b*. The additional register 434*c* is provided to detect a triple same-same-same entry. Registers 434*b* and 434*c* are cleared via OR gates 434*d* and 434*e* whenever either a reference code-word is detected or a run length code-word is required.

Figure 13:
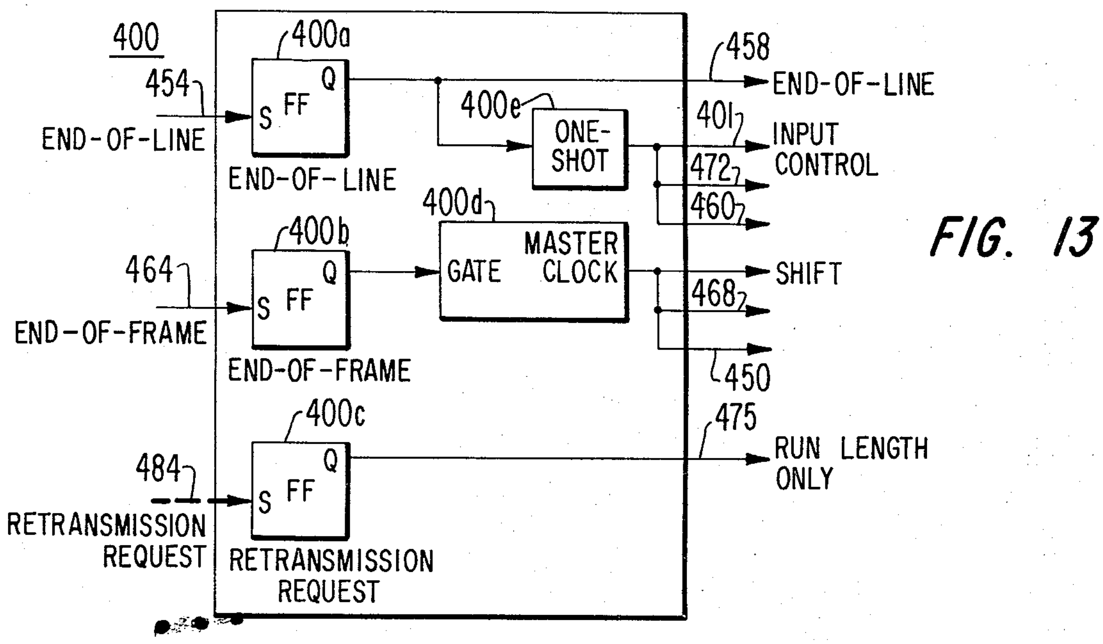
FIG. 13 is a diagram showing a specific implementation for the Control Logic shown in FIG. 4.

Referring now to FIG. 13, the details of the implementation for the Control Logic 400 are shown. Control Logic 400 comprises flip-flops 400*a*, 400*b*, 400*c* one-shot 400*e* and master clock generator 400*d*. An end-of-line signal on line 454 sets flip-flop 400*a* which in turn provides an output signal on line 458 and signals on lines 401, 460 and 472 via one-shot 400*e*. An end-of-frame signal on line 464 sets flip-flop 400*b* which in turn gates on generator 400*d* to provide output signals on the shift line and on lines 450 and 468. A signal on the retransmission request line 484 sets flip-flop 400*c* which provides an output signal on line 475.

Figure 14:
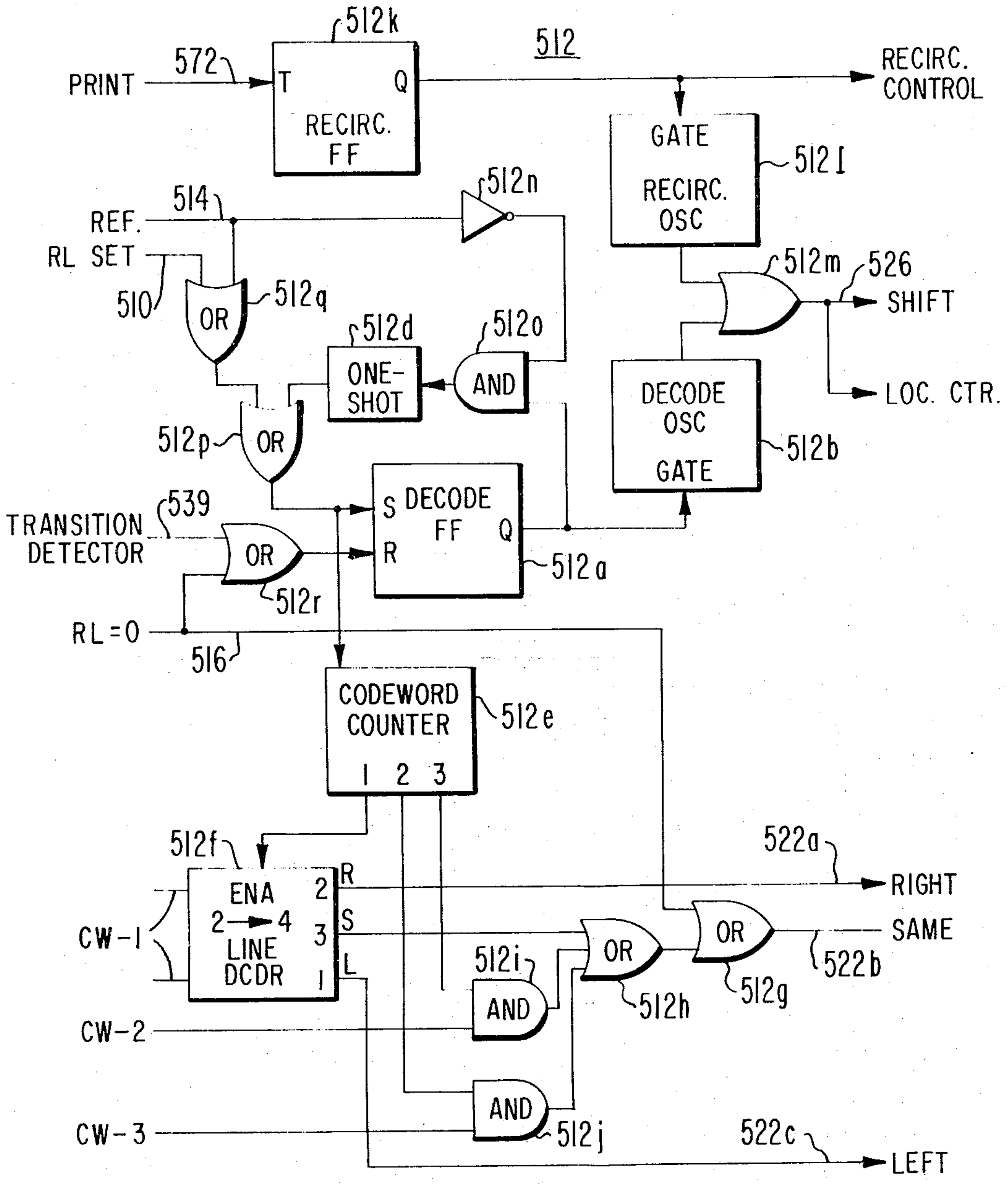
FIG. 14 is a diagram of a specific implementation for the Decode and Buffer Control shown in FIGS. 5, 6 and 7.

Referring now to FIG. 14, the details of the implementation for the Decode and Buffer Control unit 512 are shown. Decode and Buffer Control 512 controls the reconstruction of the image scan line in the output buffer register 520 and controls the recirculation of buffer register 520 to provide the reconstructed line as an output signal of buffer register 520. When a signal is available on line 514 or on the RL set line, indicating a new code-word is available for processing, the decode flip-flop 512*a* is set. The setting of flip-flop 512*a* gates on the decode oscillator 512*b*. Decode oscillator 512*b* generates shift pulses on line 526 and provides pulses to location counter 538 via OR gate 512*m*. Decode oscillator 512*b* remains on until a transition is detected by transition detector 534 and a signal is provided to Decode and Buffer Control 512 via line 539 in the case of reference entries, or until the run length counter 508 reaches zero and a corresponding signal is provided on line 516 in the case of a run length entry. The aforementioned conditions cause decode flip-flop 512*a* to be reset which in turn gates off decode oscillator 512*b*.

In order to decode multiple reference entries, decode flip-flop 512*a* can be set by the one-shot 512*d*. One-shot 512*d* is effective to set decode flip-flop 512*a* when unit 512*d* is enabled via AND gate 512*o*. The output signal from 512*d* also increments the code-word counter 512*e* to sequence through the three possible run length entries per code-word. The first possible code-word may be S, L, or R and is represented by the two bits coming in on lines CW-1 which come in from the code-word recognizer 504. A 2-4 line decoder 512*f* is used to decode the CW-1 bits. The bits on lines CW-2 and CW-3 can only be S code-words and therefore require only one bit each. In any case, when buffer register 520 has been positioned properly, a signal on line 522*a*, 522*b*, or 522*c* is provided via gates 512*g*–512*j* to access register 518.

When an end-of-line condition generates a print pulse on line 572 the recirculate flip-flop 512*k* is set providing a recirculate control pulse and causing the recirculate oscillator 5121 to be gated on. Recirculate oscillator 5121 generates shift and location counter pulses which are effective to recirculate buffer register 520.

Figure 15:
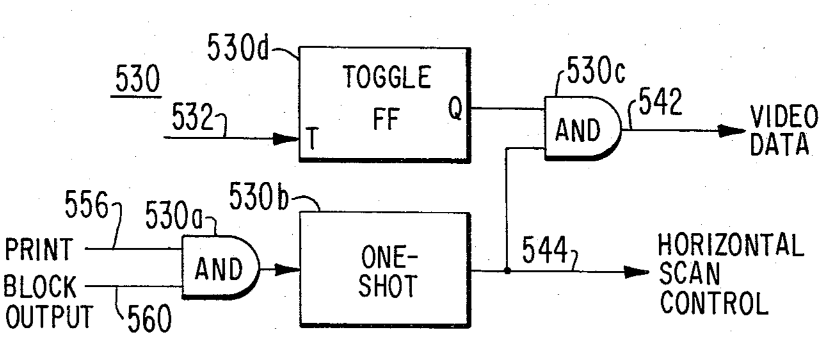
FIG. 15 is a diagram of a specific implementation for the Output Control shown in FIGS. 5, 6 and 7.

Referring now to FIG. 15, the details of the implementation for the Output Control 530 are shown. Output Control 530 comprises AND gates 530*a* and 530*c*, toggle flip-flop 530*d* and one-shot 530*b*. A print pulse appearing on line 556 activates one-shot 530*b* via AND gate 530*a*. One-shot 530*b* provides an output pulse of the required duration to serve as a horizontal scan control signal on line 544 for use by the external recording means. The output signal from one-shot 530*b* also passes the output buffer register 520 signal on line 532 through AND gate 530*c*. The output signal from AND gate 530*c* is provided as the video data signal on line 542. If an error has been detected, the block output signal on line 560 inhibits the firing of one-shot 530*b* via AND gate 530*c*. The toggle flip-flop 530*d* converts the transition scan line signal into a standard black and white video signal.

Figure 16:
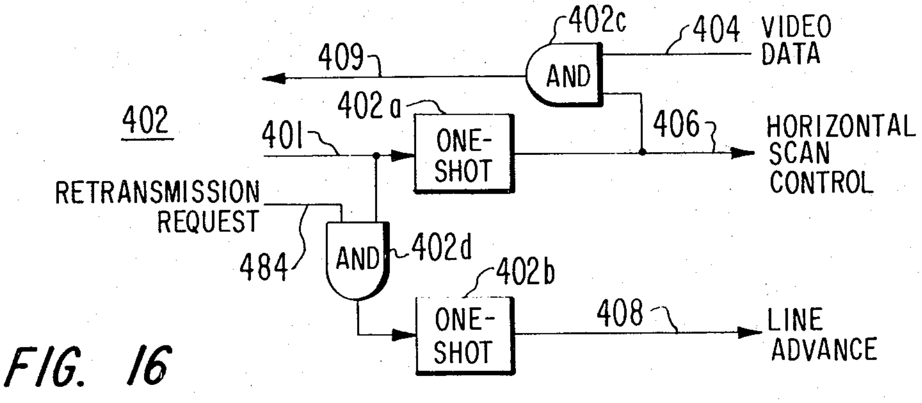
FIG. 16 is a diagram of a specific implementation for the Input Control shown in FIG. 4.

Referring now to FIG. 16, the details of the implementation for the Input Control 402 are shown. Input Control 402 comprises AND gates 402*c* and 402*d* and one-shot circuits 402*a* and 402*b*. An input request signal on line 401 fires one-shot 402*a*, the pulse duration is set to the proper length for use by an external scanning means as a horizontal scan control signal on line 406. The input request signal also triggers one-shot 402*b* whose output signal on line 408 causes the external scanning means to advance to the next line. The output signal from one-shot 402*a* also enables AND gate 402*c* thereby passing video data signals on line 404 to the bit transition detector 410 via line 409.

In the event of a retransmission request signal on line 484, one-shot 402*b* is inhibited via AND gate 402*d*. Thus the line is not advanced and the previous line is rescanned.

Figure 17:
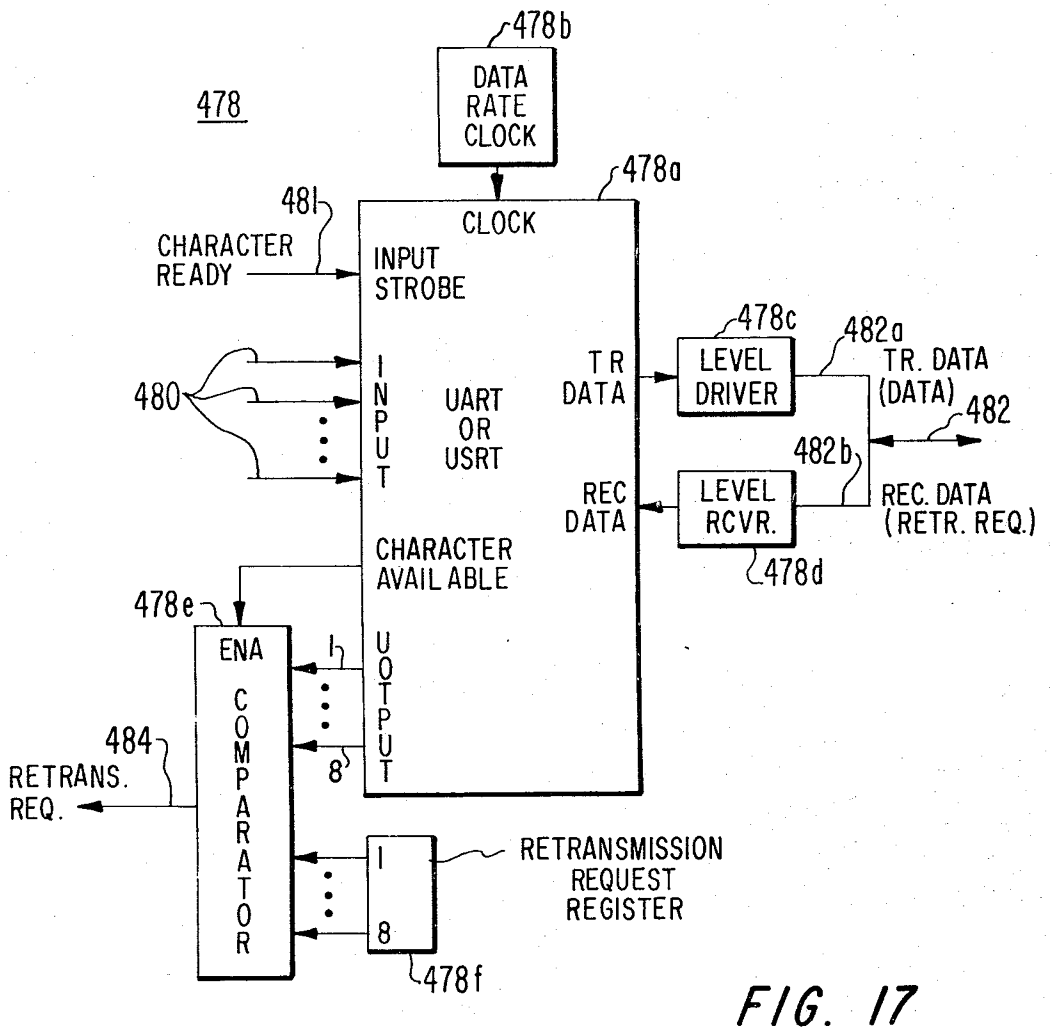
FIG. 17 is a diagram of a specific implementation for the Output Interface shown in FIG. 4.

Referring now to FIG. 17, the details of the implementation for the Output Interface 478 are shown. Output Interface 478 is built around a standard commercially available LS1 chip 478*a*. For asynchronous transmissions a Universal Asynchronous Receiver/-Transmitter (UART) chip, model number COM 2502, is used. For synchronous operation a Universal Synchronous Receiver/Transmitter (USRT) chip, model number COM 2601, is used. Level driver 478*c* converts logic signal levels to those required by the external modem. Level receiver 478*d* provides the reverse conversion. For EIA standard transmission, drivers and receivers such as models MC 1488 and MC 1489 are used.

The Output Interface 478 converts parallel code-words to serial form for transmission over the communications channel represented by line 482 and when required detects retransmission requests. This latter function is performed by comparing in comparator 478*e*, the received data to a predetermined retransmission request character stored in the retransmission request register 478*f*. Alternatively, when a communications link with a reverse channel is used the reverse channel may be used directly as a retransmission request. In this case, comparator 478*e* and register 478*f* are unnecessary and the LSI chip 478*a* operates in a transmit only mode.

Figure 18:
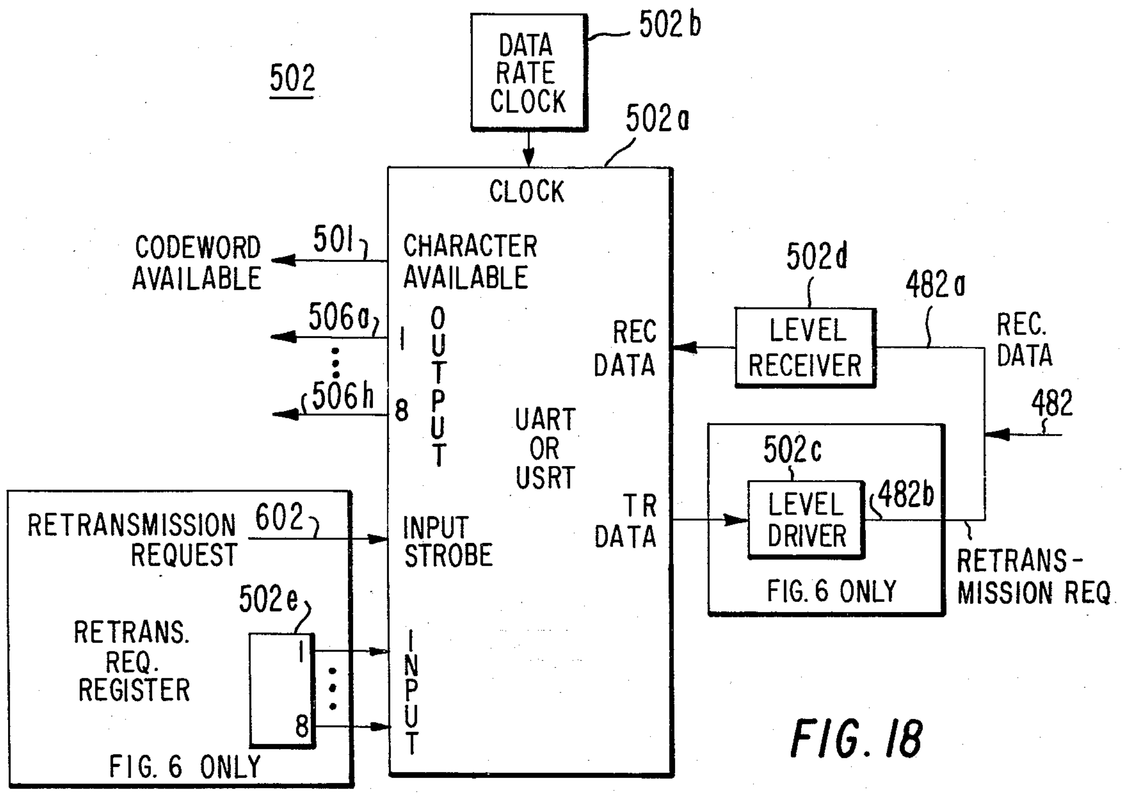
FIG. 18 is a diagram of a specific implementation for the Input Interface shown in FIGS. 5, 6 and 7.

Referring now to FIG. 18, the details of the implementation for the Input Interface 502 are shown. The Input Interface 502 utilizes elements similar to those discussed in connection with FIG. 17. The Input Interface 502 receives serial data from the communications channel 482 and assembles the data into 8 bit parallel code-words. In connection with FIG. 6, the input Interface 502 also transmits, on command, the predetermined retransmission request character stored in the retransmission request register 502*e*.

Figure 19:
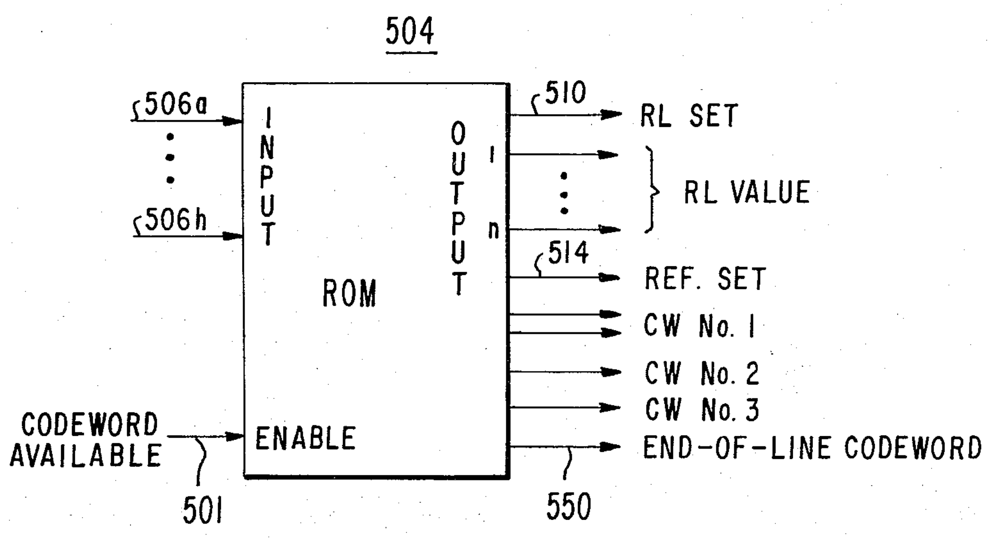
FIG. 19 is a diagram of a specific implementation for the Codeword Recognizer shown in FIGS. 5, 6 and 7.

Referring now to FIG. 19, the details of the implementation for the Code-word Recognizer 504 are shown. Code-word Recognizer 504 is essentially, an 8 by 11 bit ROM which decodes each 8 bit input code-word according to the code-word dictionary of FIG. 2. For a run length code-word, the ROM puts out a run length set pulse on line 510 along with the valve to which the run length counter 408 is to be set. When a reference code-word is detected, a reference set pulse on line 514 is generated along with one or more signals indicating the specific reference entries required. When an end-of-line code-word is recognized, an end-of-line pulse is generated on line 550.

What is claimed is:

1. In a compressed image data facsimile system incorporating an encoder for encoding the respective locations of transitions between tones in a current scanned line of copy, said current scanned line having a predetermined length defined by initial and terminal points having given locations, said encoder utilizing run-length code-words manifesting the distance between transitions on said current scanned line and arranging said code-words serially in a group manifesting said current scanned line; and a decoder responsive to encoded signals transmitted thereto, said decoder detecting code-words and decoding said group of code-words to reconstruct the locations of the transitions, the improvement comprising therewith:

a. means including said encoder for encoding as a code-word the location of said terminal point of said scanned line as an additional transition;
b. means including said encoder for generating an end-of-line code-word to identify said additional-transition code-word, thereby distinguishing said additional-transition code-word from other transition code-words;
c. means including said decoder for accumulating distances between successive transitions and generating a complete line signal when the manifested length of a decoded line corresponds to the predetermined length of a completely scanned line;
d. means including said decoder for generating an end-of-line signal when said end-of-line code-word is detected; and
e. error detecting means responsive to said end-of-line signal and to said complete line signal for generating an error signal manifesting the occurrence of an error when either of said end-of-line signal or said complete line signal occurs without the simultaneous occurrence of the other.

2. The facsimile system according to claim 1, wherein said error detecting means includes means responsive to said end-of-line signal and to said complete line signal for generating a print signal manifesting the absence of an error only when said end-of-line signal and said complete line signal occur simultaneously; and means responsive to a print signal occurring after an error has been previously detected for terminating the error signal.

3. The facsimile system according to claim 2, wherein said decoder further includes output writing means coupled to said error detecting means for writing tones on an output copy in accordance with the location of the transitions of said encoded line; and inhibiting means coupled to said output writing means for inhibiting said output writing means from writing output tones in response to said error signal.

4. The facsimile system according to claim 3, wherein said error detecting means includes means responsive to said error signal and to said end-of-line signal for synchronizing the operation of said decoder with the occurrence of said end-of-line signal only during the presence of said error signal.

5. The facsimile system according to claim 4, wherein said decoder further includes line advance means coupled to said output writing means and responsive to said end-of-line signal, said error signal and said print signal for advancing said output writing means to the next line on said output copy only upon the occurrence of said print signal and advancing said output writing means to the next line on said output copy upon the occurrence of said end-of-line signal only when an error has occurred.

6. The facsimile according to claim 5, wherein said line advance means includes optionally-operated inhibiting means for selectively preventing said output writing means from advancing in response to said end-of-line signal whenever said inhibiting means is operated.

7. The facsimile system according to claim 4, wherein said encoder includes means for encoding the locations of the transitions in said current scanned line utilizing reference code-words manifesting the relative locations of the transitions in said current scanned line to the locations of transitions in a preceding scanned line; and means for encoding a scanned line utilizing only run-length code-words at periodic intervals determined by a predetermined integral number of scanned lines, and wherein said decoder includes means for decoding said reference code-words.

8. The facsimile system according to claim 7, wherein said decoder further includes line advance means coupled to said output writing means and responsive to said end-of-line signal, said error signal and said print signal for advancing said output writing means to the next line on said output copy only upon the occurrence of said print signal and advancing said output writing means to the next line on said output copy upon the occurrence of said end-of-line signal only when an error has occurred.

9. The facsimile system according to claim 8, wherein said line advance means includes optionally-operated inhibiting means for selectively preventing said output writing means from advancing in response to said end-of-line signal whenever said inhibiting means is operated.

10. The facsimile system according to claim 3, wherein said decoder includes means responsive to said error signal for transmitting a retransmission request signal to said encoder to initiate re-encoding and re-transmitting that current scanned line in which an error has occurred, and wherein said encoder includes means responsive to the receiving of said retransmission signal for re-encoding and retransmitting that current scanned line in which an error has occurred.

11. The facsimile system according to claim 10, wherein said encoder includes means for encoding locations of said transitions between tones in said current scanned line utilizing reference code-words manifesting the relative locations of the transitions in said current scanned line to the locations of transitions in the preceding scanned line; and wherein said decoder includes first register means for storing signals manifesting the locations of transitions, as run-length and reference code-words that manifest scanned lines are decoded; means coupled to said first register means for decoding currently-received reference code-words in accordance with the signals previously stored in said first register which manifest the locations of the transitions in said preceding line means and for also decoding currently received run-length code-words; second register means for storing signals manifesting the locations of the transitions of said preceding scanned lines; and means including switch means coupled to said first and second register means and responsive to the absence of any error signal for recirculating the contents of said first register means while transferring said contents into said second register means, and responsive to the presence of any error signal for transferring the contents of said second register means into said first register means.

12. The facsimile system according to claim 10, wherein said encoder includes means for encoding the locations of the transitions in said current scanned line utilizing reference code-words manifesting the relative locations of the transitions in said current scanned line to the locations of the transitions in a preceding scanned line; and wherein said means for re-encoding that current scanned line in which an error has occurred utilizes only run-length code-words; and wherein said decoder includes means for decoding said reference code-words.

13. In a method for encoding and decoding compressed image facsimile data, incorporating the steps of encoding the respective locations of transitions between tones in a current scanned line of copy, said current scanned line having a predetermined length defined by initial and terminal points having given locations, said encoding step utilizing run-length code-words manifesting the distance between transitions on said current scanned line and arranging said code-words serially in a group manifesting said current scanned line; transmitting said group of code-words; receiving said group of code-words; and detecting and decoding said code-words to reconstruct the locations of the transitions, the improvement comprising therewith the further steps of:

a. encoding as a code-word the location of said terminal point of said scanned line as an additional transition during said encoding step;

b. generating an end-of-line code-word to identify said additional-transition code-word during said encoding step, thereby distinguishing said additional transition code-words;

c. accumulating distances between successive transitions and generating a complete line signal when the manifested length of a decoded line corresponds to the predetermined length of a completely scanned line during said decoding step;

d. generating an end-of-line signal when said end-of-line code-word is detected during said decoding step; and e. generating an error signal in response to said end-of-line signal and to said complete line signal, said error signal manifesting the occurrence of an error when either of said end-of-line signal or said complete line signal occurs without the simultaneous occurrence of the other during said decoding step.

* * * * *

UNITED STATES PATENT OFFICE
CERTIFICATE OF CORRECTION

PATENT NO. : 3,927,251

DATED : December 16, 1975

INVENTOR(S) : H.E. White & M.D. Lippman

It is certified that error appears in the above-identified patent and that said Letters Patent are hereby corrected as shown below:

Col. 1, line 28 change "in" to --on--

Col. 7, line 13 change "he" to --the--

Col. 7, line 54 change "uponn" to --upon--

Col. 8, line 40 change "as" to --so--

Col. 8, line 51 change "40" to --400--

Col. 8, line 58 change "ccomparator" to --comparator--

Col. 14, line 30 change "present" to --presently--

Col. 20, line 11 change "mayu" to --may--

Signed and Sealed this

*twenty-seventh* Day of *April 1976*

[SEAL]

*Attest:*

RUTH C. MASON
*Attesting Officer*

C. MARSHALL DANN
*Commissioner of Patents and Trademarks*